United States Patent
Howard et al.

(10) Patent No.: US 11,485,387 B2
(45) Date of Patent: Nov. 1, 2022

(54) SYSTEM AND METHOD FOR PREDICTIVE NAVIGATION CONTROL

(71) Applicant: GM GLOBAL TECHNOLOGY OPERATIONS LLC, Detroit, MI (US)

(72) Inventors: Michael D. Howard, Westlake Village, CA (US); Hyukseong Kwon, Thousand Oaks, CA (US); Rajan Bhattacharyya, Sherman Oaks, CA (US)

(73) Assignee: GM Global Technology Operations LLC, Detroit, MI (US)

(*) Notice: Subject to any disclaimer, the term of this patent is extended or adjusted under 35 U.S.C. 154(b) by 141 days.

(21) Appl. No.: 17/114,977

(22) Filed: Dec. 8, 2020

(65) Prior Publication Data
US 2022/0177002 A1 Jun. 9, 2022

(51) Int. Cl.
*B60W 60/00* (2020.01)
*B60W 50/00* (2006.01)
(Continued)

(52) U.S. Cl.
CPC .... *B60W 60/0027* (2020.02); *B60W 30/0956* (2013.01); *B60W 40/06* (2013.01); *B60W 40/09* (2013.01); *B60W 50/0097* (2013.01); *G01C 21/3461* (2013.01); *G01C 21/3691* (2013.01); *G06N 5/02* (2013.01); *B60W 2420/40* (2013.01); *B60W 2420/52* (2013.01); *B60W 2420/54* (2013.01); *B60W 2540/22* (2013.01); *B60W 2540/30* (2013.01); *B60W 2552/05* (2020.02);
(Continued)

(58) Field of Classification Search
None
See application file for complete search history.

(56) References Cited

U.S. PATENT DOCUMENTS

| | | | |
|---|---|---|---|
| 10,409,279 B2 | 9/2019 | Kwon et al. | |
| 2011/0060425 A1* | 3/2011 | Freed | G06N 3/008 700/33 |

(Continued)

OTHER PUBLICATIONS

G. S. Aoude, B. D. Luders, K. K. H. Lee, D. S. Levine, and J. P. How, "Threat Assessment Design for Driver Assistance Systems at Intersections," in Proc. of IEEE Intelligent Vehicles Symposium, pp. 1855-1862, Sep. 2010.

(Continued)

*Primary Examiner* — David P. Merlino
(74) *Attorney, Agent, or Firm* — Quinn IP Law

(57) ABSTRACT

A method of predictive navigation control for an ego vehicle includes: comparing a cue node to each of a plurality of episodic memory nodes in an episodic memory structure, wherein the cue node represents a new event representing distances, speeds and headings of one or more newly observed objects about the ego vehicle, and wherein the episodic memory structure includes a network of nodes each representing a respective previously existing event and having a respective node risk and likelihood; determining which of the nodes has a smallest respective difference metric, thus defining a best matching node; consolidating the cue node with the best matching node if the smallest difference metric is less than a match tolerance, else adding a new node corresponding to the cue node to the episodic memory structure; and identifying a likeliest next node and/or a riskiest next node.

20 Claims, 10 Drawing Sheets

(51) Int. Cl.
*B60W 30/095* (2012.01)
*B60W 40/06* (2012.01)
*G01C 21/34* (2006.01)
*B60W 40/09* (2012.01)
*G01C 21/36* (2006.01)
*G06N 5/02* (2006.01)

(52) U.S. Cl.
CPC .............. *B60W 2554/4042* (2020.02); *B60W 2554/4044* (2020.02); *B60W 2554/80* (2020.02); *B60W 2555/20* (2020.02)

(56) References Cited

U.S. PATENT DOCUMENTS

| | | | |
|---|---|---|---|
| 2017/0268896 A1* | 9/2017 | Bai | G08G 1/0112 |
| 2018/0210939 A1* | 7/2018 | Cho | G06F 16/2477 |
| 2021/0094587 A1* | 4/2021 | Pilly | G06N 3/088 |

OTHER PUBLICATIONS

D. Greene, J. Liu, J. Reich, Y. Hirokawa, A. Shinagawa, H. Ito, and T. Mikami, "An Efficient Computational Architecture for Collision Early-Warning System for Vehicles, Pedestrians, and Bicycles," IEEE Transactions on Intelligent Transportation Systems, vol. 12, No. 4, pp. 942-953, Dec. 2011.

S. Klingelschmitt, M. Platho, H.-M. Gros, V. Willert, and Julian Eggert, "Combining Behavior and Situation Information for Reliably Estimating Multiple Intentions," in Proc. of IEEE Intelligent Vehicles Symposium, pp. 388-393, Jun. 2014.

P. Kumar, M. Perrollaz, S. Lefevre, and C. Laugier, "Learning-based Approach for Online Lane Change Intention Prediction," in Proc. of IEEE Intelligent Vehicles Symposium, pp. 797-802, Jun. 2013.

J. E. Laird, A. Newell and P. S. Rosenbloom, "SOAR: An architecture for general intelligence," Artificial Intelligence, 33(1), 1-64, pp. 1-45, 1987.

P. Langley and K. Cummings, "Hierarchical skills and cognitive architectures," In in Proc. 26th Annu. Conf. Cogn. Sci. Soc, pp. 779-784, 2004.

B. Morris, A. Doshi, and M. Trivedi, "Lane Change Intent Prediction for Driver Assistance: On-Road Design and Evaluation," in Proc. of IEEE Intelligent Vehicles Symposium, pp. 895-901, Jun. 2011.

A. Nuxoll and J. Laird, "A Cognitive Model of Episodic Memory Integrated With a General Cognitive Architecture," International Conference on Cognitive Modeling, pp. 220-225, 2004.

T. Streubel and K. H. Hoffmann, "Prediction of Driver Intended Path at Intersection," in Proc. of IEEE Intelligent Vehicles Symposium, pp. 134-139, Jun. 2014.

J. Winkler, M. Tenorth, A. K. Bozcuoglu and M. Beetz, "CRAMm—Memories for Robots Performing Everyday Manipulation Activities," Advances in Cognitive Systems, pp. 91-108, 2014.

R. Jafari, S. Zeng, N. Moshchuk, and B. Litkouhi, "Reactive Path Planning for Emergency Steering Maneuvers on Highway Roads," American Control Conference, pp. 2943-2949, May 2017.

* cited by examiner

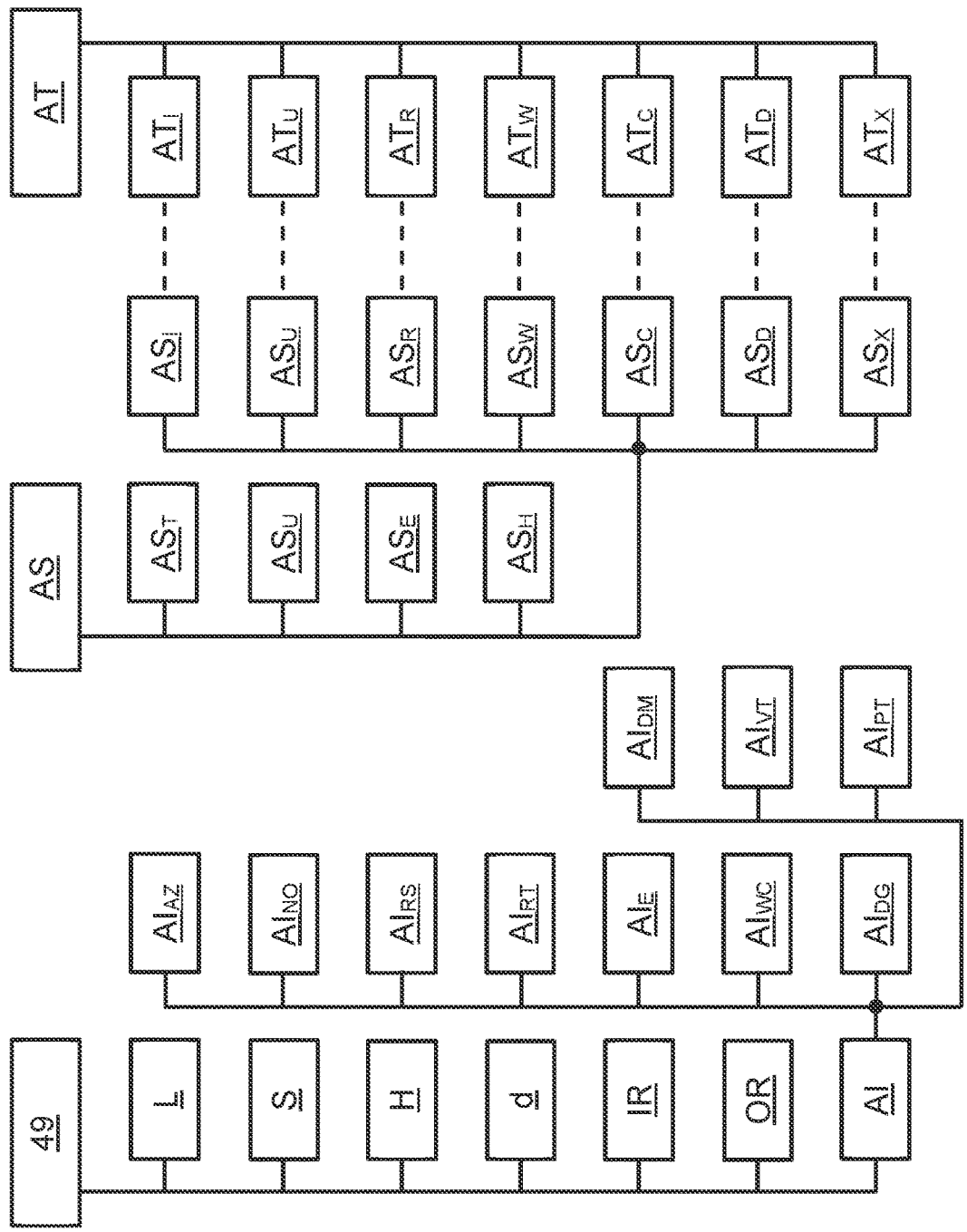

SYSTEM AND METHOD FOR PREDICTIVE NAVIGATION CONTROL

INTRODUCTION

This disclosure relates generally to systems and methods of predictive navigation control for autonomous and semi-autonomous vehicles.

Autonomous and semi-autonomous vehicles (sometimes called ego vehicles or host vehicles) provide some level of self-navigation (i.e., navigation of the vehicle without real-time human intervention). Such self-navigation may rely on the vehicle's control system knowing the surrounding environment and where the vehicle is located within that environment in real time. To accomplish this, the vehicle's control system may use a combination of stored information (e.g., maps), information received periodically or in real time from outside the vehicle via sensors, and logic programmed into the control system.

SUMMARY

According to one embodiment, a method of predictive navigation control for an ego vehicle includes: (a) comparing a cue node to each of a plurality of episodic memory nodes in an episodic memory structure, wherein the cue node represents a new event associated with a set of respective locations, speeds and headings associated with one or more newly observed objects each located within a respective one of a plurality of newly defined attention zones about the ego vehicle, and wherein the episodic memory structure includes a selectively interconnected and directed network of the episodic memory nodes, wherein each episodic memory node represents a respective previously existing event, with each previously existing event being associated with a respective set of locations, speeds and headings associated with one or more previously observed objects each located within one of a plurality of previously defined attention zones about the ego vehicle, and wherein each episodic memory node has a respective node risk and a respective likelihood associated therewith; (b) determining which of the plurality of episodic memory nodes has a smallest respective difference metric, thus defining a best matching episodic memory node, wherein each respective difference metric is determined based on a respective aggregate difference between one or more respective characteristics of the respective episodic memory node and the cue node; (c) consolidating the cue node with the best matching episodic memory node if the smallest respective difference metric is less than a predetermined match tolerance, or adding a new episodic memory node corresponding to the cue node to the episodic memory structure if the smallest respective difference metric is greater than or equal to the predetermined match tolerance; and (d) identifying one or both of (i) a likeliest next episodic memory node among one or more episodic memory nodes immediately downstream from the best matching or new episodic memory node, wherein the likeliest next episodic memory node has a highest likelihood among the immediately downstream episodic memory nodes, and (ii) a riskiest next episodic memory node among the one or more episodic memory nodes immediately downstream from the best matching or new episodic memory node, wherein the riskiest next episodic memory node has a highest node risk among the immediately downstream episodic memory nodes.

The respective node risk of each episodic memory node may be a respective maximum, average or aggregate of respective object risks for the one or more previously observed objects in the associated previously existing event, and the respective object risk for each previously observed object may be determined by a sigmoidal function applied to a respective distance between the previously observed object and the ego vehicle.

The method may further include: calculating a respective individual risk for each of the one or more newly observed objects using the sigmoidal function applied to a respective distance between each respective newly observed object and the ego vehicle; establishing a respective overall risk for each of the plurality of newly defined attention zones, based on the respective individual risks of the one or more newly observed objects located within each respective newly defined attention zone; and defining the cue node as a grouping of the plurality of newly defined attention zones organized according to their respective overall risks.

The respective object risk or individual risk for each previously observed or newly observed object, respectively, may be determined by $R=2 \cdot (\{1-1/(1+e^{[(mindist-SAFEDIST)/(SAFEDIST/2)]}\}-0.5)+0.5$, where R is the respective object risk or individual risk, mindist is a distance to the previously observed or newly observed object from the ego vehicle, and where SAFEDIST is a distance which depends on one or more of a road surface type, road structure type, weather/environmental conditions, and a relative lane position, closing velocity or closing acceleration between the previously observed or newly observed object and the ego vehicle.

Each of the respective locations, speeds and headings of the one or more newly observed objects and the one or more previously observed objects may be defined with respect to the ego vehicle. Each respective aggregate difference may be a respective total of one or more weighted penalties assigned against each of one or more differences between the respective characteristics of the respective episodic memory node and the cue node, and the characteristics may include one or more of number and type of attention zones, number of objects in each attention zone, road surface type, road structure type, environment type, weather/environmental conditions, driving goal, driving mode, vehicle type, powertrain type and respective locations, speeds, headings, distances from the ego vehicle and object risks associated with the one or more previously observed and/or newly observed objects.

The method may further include back-propagating a respective node risk associated with a high-risk episodic memory node to one or more episodic memory nodes upstream of the high-risk episodic memory node, wherein the associated node risk is greater than a predetermined risk threshold. The back-propagation of the associated node risk may utilize a linear function or a logistic function.

When a new episodic memory node is added to the episodic memory structure, the new episodic memory node may be added as a child node to one or more parent nodes, wherein each parent node is a previously existing episodic memory node, and wherein the new episodic memory node is assigned an initial likelihood value. Each episodic memory node may also have a respective node reward.

According to another embodiment, a method of optimizing a decision for a decider includes a comparing step, a determining step, a consolidating step and an identifying step. The comparing step includes comparing a cue node to each of a plurality of episodic memory nodes in an episodic memory structure, wherein the cue node represents a new event associated with a set of respective attributes associated with one or more newly observed stimuli each assigned to a respective one of a plurality of newly defined attention zones defined with respect to a current state of the decider, and wherein the episodic memory structure includes a selectively interconnected and directed network of the episodic memory nodes, wherein each episodic memory node represents a respective previously existing event, with each previously existing event being associated with a respective set of attributes associated with one or more previously observed stimuli each assigned to a respective one of a plurality of previously defined attention zones defined with respect to a respective previous state of the decider, and wherein each episodic memory node has a respective node risk and a respective likelihood associated therewith.

The determining step includes determining which of the plurality of episodic memory nodes has a smallest respective difference metric, thus defining a best matching episodic memory node, wherein each respective difference metric is determined based on a respective aggregate difference between one or more respective aspects of the respective episodic memory node and the cue node. The consolidating step includes consolidating the cue node with the best matching episodic memory node if the smallest respective difference metric is less than a predetermined match tolerance, or adding a new episodic memory node corresponding to the cue node to the episodic memory structure if the smallest respective difference metric is greater than or equal to the predetermined match tolerance. And the identifying step includes identifying one or both of (i) a likeliest next episodic memory node among one or more episodic memory nodes immediately downstream from the best matching or new episodic memory node, wherein the likeliest next episodic memory node has a highest likelihood among the immediately downstream episodic memory nodes, and (ii) a riskiest next episodic memory node among the one or more episodic memory nodes immediately downstream from the best matching or new episodic memory node, wherein the riskiest next episodic memory node has a highest node risk among the immediately downstream episodic memory nodes.

The respective node risk of each episodic memory node may be a respective maximum, average or aggregate of respective stimulus risks for the one or more previously observed stimuli in the associated previously existing event, and the respective stimulus risk for each previously observed stimulus may be determined by a sigmoidal function applied to a respective effect potential between the previously observed stimulus and the one or more goals of the decider. Each respective aggregate difference may be a respective total of one or more weighted penalties assigned against each of one or more differences between the respective aspects of the respective episodic memory node and the cue node.

The method may further include: calculating a respective individual risk for each of the one or more newly observed stimuli using the sigmoidal function applied to a respective effect potential between each respective newly observed stimulus and the one or more goals of the decider; establishing a respective overall risk for each of the plurality of newly defined attention zones, based on the respective individual risks of the one or more newly observed stimuli assigned to each respective newly defined attention zone; and defining the cue node as a grouping of the plurality of newly defined attention zones organized according to their respective overall risks.

Each of the respective attributes of the one or more newly observed stimuli and the one or more previously observed stimuli may be defined with respect to one or more goals of the decider. The attributes may include one or more of importance, urgency, risk, reward, cost, duration and difficulty. The aspects may include one or more of user temperament, user skill level, environmental factors, prior user habits and the respective importance, urgency, risk, reward, cost, duration and difficulty associated with the one or more previously observed or newly observed stimuli. And the goals of the decider may include one or more of minimizing risk, optimizing utility, optimizing risk versus reward, learning to anticipate a user's needs, finding the most helpful information, and learning how to recognize when to offer help to a user.

According to yet another embodiment, a controller for predictive navigation control for an ego vehicle includes a data ingest module, an episodic memory module and a prediction module. The data ingest module is configured to receive inputs relating to a cue node, wherein the cue node represents a new event associated with a set of respective locations, speeds and headings associated with one or more newly observed objects each located within a respective one of a plurality of newly defined attention zones about the ego vehicle. The data ingest module is further configured to: (i) calculate a respective individual risk for each of the one or more newly observed objects using a sigmoidal function applied to a respective distance between each respective newly observed object and the ego vehicle; (ii) establish a respective overall risk for each of the plurality of newly defined attention zones, based on the respective individual risks of the one or more newly observed objects located within each respective newly defined attention zone; and (iii) define the cue node as a grouping of the plurality of newly defined attention zones organized according to their respective overall risks The episodic memory module is operatively connected with the data ingest module and contains an episodic memory structure including a selectively interconnected and directed network of episodic memory nodes, wherein each episodic memory node represents a respective previously existing event, with each previously existing event being associated with a respective set of locations, speeds and headings associated with one or more previously observed objects each located within one of a plurality of previously defined attention zones about the ego vehicle, and wherein each episodic memory node has a respective node risk and a respective likelihood associated therewith. The episodic memory module is configured to: (x) compare the cue node to each of the episodic memory nodes; (y) determine which of the episodic memory nodes has a smallest respective difference metric, thus defining a best matching episodic memory node, wherein each respective difference metric is determined based on a respective aggregate difference between one or more respective characteristics of the respective episodic memory node and the cue node; and (z) consolidate the cue node with the best matching episodic memory node if the smallest respective difference metric is less than a predetermined match tolerance, or add a new episodic memory node corresponding to the cue node to the episodic memory structure if the smallest respective difference metric is greater than or equal to the predetermined match tolerance.

The prediction module is operatively connected with the episodic memory module and is configured to identify one or both of: a likeliest next episodic memory node among one or more episodic memory nodes immediately downstream from the best matching or new episodic memory node, wherein the likeliest next episodic memory node has a highest likelihood among the immediately downstream episodic memory nodes; and a riskiest next episodic memory node among the one or more episodic memory nodes immediately downstream from the best matching or new episodic memory node, wherein the riskiest next episodic memory node has a highest node risk among the immediately downstream episodic memory nodes.

The controller may further include a perception module operatively connected with the data ingest module and configured to: detect, as perceived data, the set of respective locations, speeds and headings associated with the one or more newly observed objects; and convert the perceived data into the inputs relating to the cue node for reception by the data ingest module.

The respective node risk of each episodic memory node may be a respective maximum, average or aggregate of respective object risks for the one or more previously observed objects in the associated previously existing event, and the respective object risk for each previously observed object may be determined by the sigmoidal function applied to a respective distance between the previously observed object and the ego vehicle. The episodic memory module may be further configured to back-propagate a respective node risk associated with a high-risk episodic memory node to one or more episodic memory nodes upstream of the high-risk episodic memory node, where the associated node risk is greater than a predetermined risk threshold.

The above features and advantages, and other features and advantages, of the present teachings are readily apparent from the following detailed description of some of the best modes and other embodiments for carrying out the present teachings, as defined in the appended claims, when taken in connection with the accompanying drawings.

BRIEF DESCRIPTION OF THE DRAWINGS

FIGS. 14-16 are block diagrams of various characteristics, aspects and attributes, and goals, respectively.

DETAILED DESCRIPTION

Figure 1:
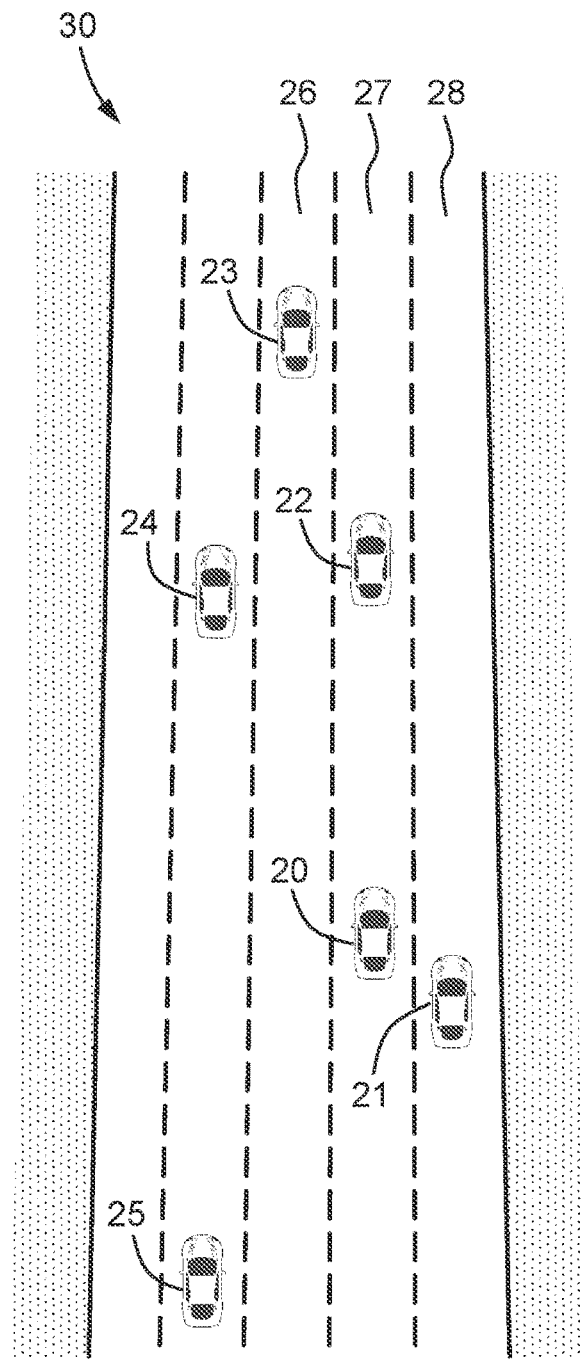
FIG. 1 is a perspective overhead view of an ego vehicle and other vehicles on a five-lane highway representing a new event.

Referring now to the drawings, wherein like numerals indicate like parts in the several views, a method 100 of predictive navigation control for an ego vehicle 20, a method 300 of optimizing a decision for a decider 50, and systems/controllers 230, 430 for implementing the respective methods 100, 300 are shown and described herein. Note that certain reference numerals in the drawings have subscripts, such as the three attention zones $32_L$, $32_H$ and $32_U$ of FIGS. 2-3. Subscripts are used in the drawings and in the present description to refer to individual elements (such as the aforementioned attention zones), while the use of reference numerals without subscripts may refer to the collective group of such elements and/or to a singular but generic one of such elements. Thus, reference numeral $32_L$ refers to a specific attention zone, while reference numeral 32 (without the subscript) may refer to all the attention zones, the group of attention zones, or a singular but generic attention zone (i.e., any attention zone).

It should be noted that while FIGS. 1-2 and 5-6 show exemplary traffic situations involving automotive passenger vehicles, the methods 100, 300 and systems/controllers 230, 430 of the present disclosure also apply to other types of autonomous and semi-autonomous vehicles and environments, such as drones and aerial vehicles flying in an airspace, ground vehicles driving over roads or terrain, mobile robots moving across surfaces and/or through structures, surface watercraft moving across the surface of a body of water, submersible watercraft moving across the surface of a body of water or at various depths beneath the surface of the body of water, satellites or spacecraft moving through space, etc. Also note that while a straight five-lane or three-lane section of highway is used in the drawings and specification, the methods 100, 300 and systems/controllers 230, 430 also apply to other road and lane configurations, including intersections, converging/diverging lanes, curving lanes, parking lots, open terrain, etc.

Figure 3:
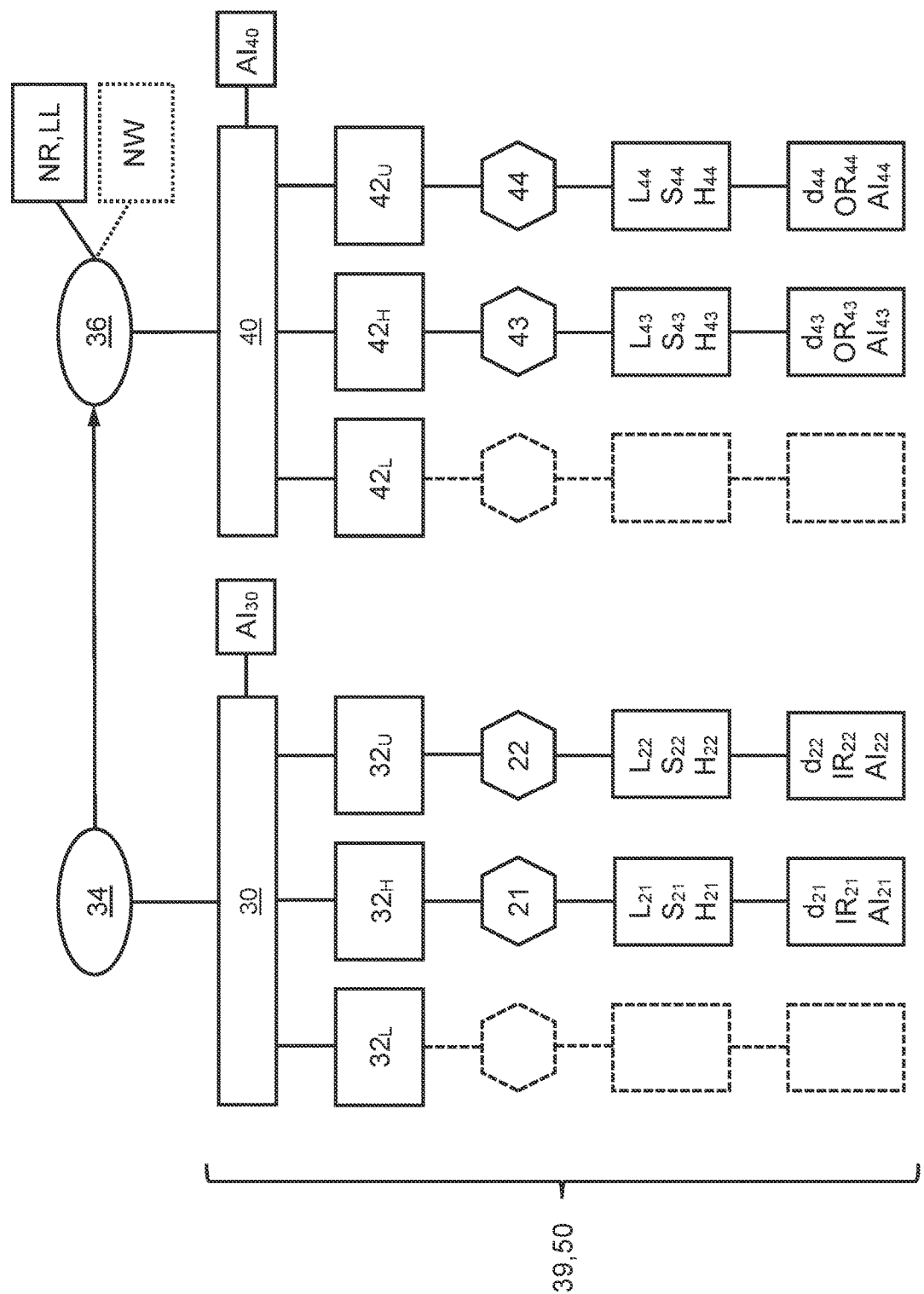
FIG. 3 is a diagram showing a cue node being compared with an episodic memory node utilizing a common event structure, for a method of predictive navigation control.
Figure 4:
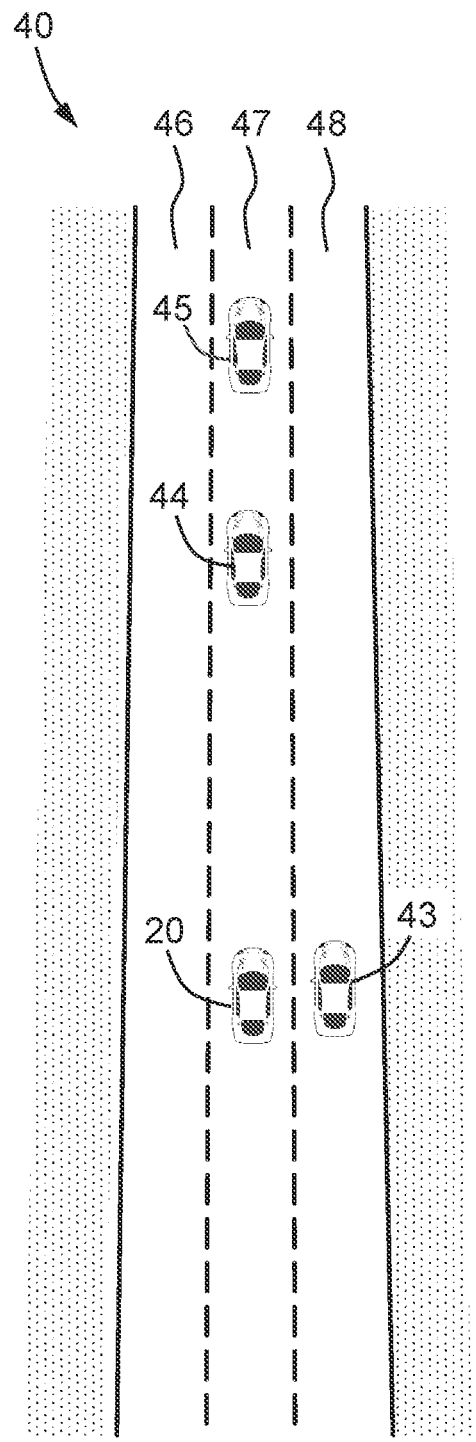
FIG. 4 is a diagram showing a cue node and an episodic memory structure.
Figure 5:
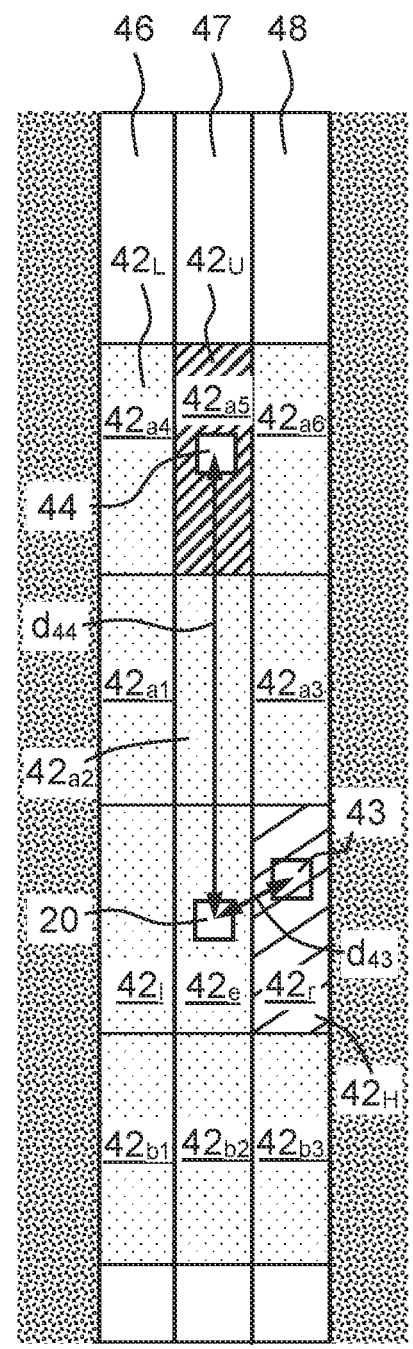
FIG. 5 is a perspective overhead view of an ego vehicle and other vehicles on a three-lane highway representing a previously existing event.
Figure 6:
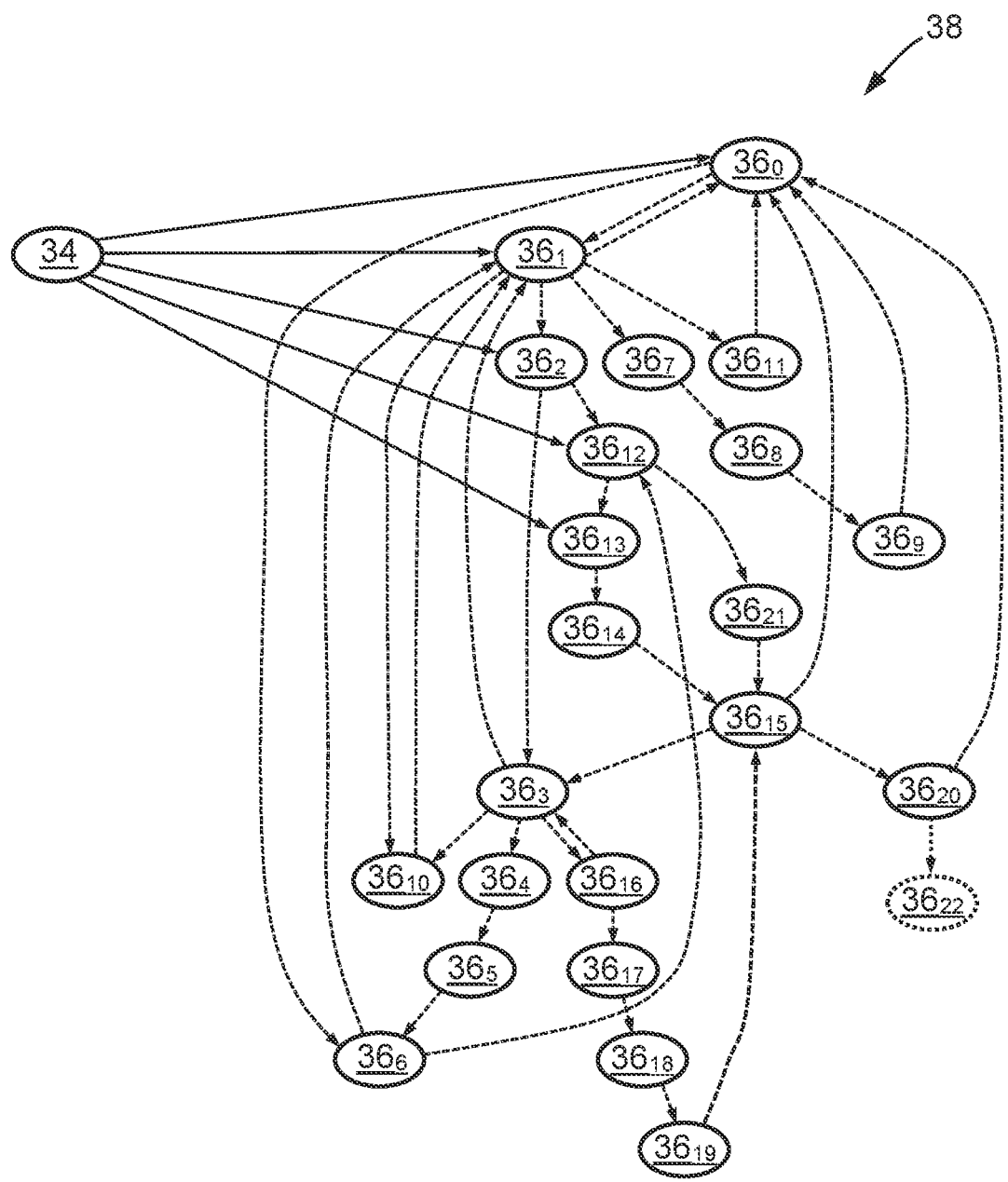
FIG. 6 is a schematic top view of the vehicles and highway of FIG. 5, showing selected attention zones.

FIGS. 1-6 illustrate a process of taking a given event 30 such as a traffic situation involving an ego vehicle 20 (FIG. 1), identifying an arrangement of attention zones 32 about the ego vehicle 20 with other neighboring vehicles/objects placed within those attention zones 32 (FIG. 2), organizing the collection of attention zones 32 and other data according to an event structure 39 (FIG. 3), and representing this collection of information as a cue node 34 which can be compared with individual episodic memory nodes 36 in an episodic memory structure 38 (FIG. 4), in which each episodic memory node 36 represents a respective previously existing event 40 (FIGS. 5-6). (Hereinafter, the abbreviation "EM" will be used to represent the words "episodic memory". Also note that "about" the ego vehicle 20 means around, ahead of, behind, beside and/or adjacent to the ego vehicle 20, and "ego vehicle 20" may refer to (i) the present host vehicle which is experiencing a new event 30 that is being transformed into a cue node 34, (ii) the present host vehicle which has previously experienced events 40 that have been transformed into EM nodes 36, and/or (iii) other host vehicles which have experienced previous events 40 that have been transformed into EM nodes 36 which have been imported into the present host vehicle.) If the cue node 34 sufficiently matches one of the EM nodes 36 in the EM structure 38, the cue node 34 may be merged or consolidated into the matching EM node 36; but, if the cue node 34 does not sufficiently match any of the EM nodes 36, the cue node 34 may be added to the EM structure 38 as a new EM node 36. This process will now be described in greater detail below.

FIG. 1 shows a perspective overhead view of an ego vehicle 20 and other vehicles 21, 22, 23, 24, 25 on a five-lane highway. The ego vehicle 20 is shown cruising in the fourth lane 27 from the left, and one other vehicle 21 (sometimes referred to herein as the "adjacent vehicle" 21) is shown in the fifth lane 28 from the left, located adjacent to the right rear of the ego vehicle 20. Another vehicle 22 (sometimes referred to herein as the "leading vehicle" 22) is shown directly ahead of the ego vehicle 20 in the same fourth lane 27 as the ego vehicle 20. This collection of vehicles 21, 22, 23, 24, 25 about the ego vehicle 20, their respective locations L, speeds S and headings H with respect to the ego vehicle 20, and the situation of driving along a straight segment of highway as shown in FIG. 1, all together provide a "snapshot" in time of a particular driving situation or event, which may be referred to as a new event 30.

Figure 2:
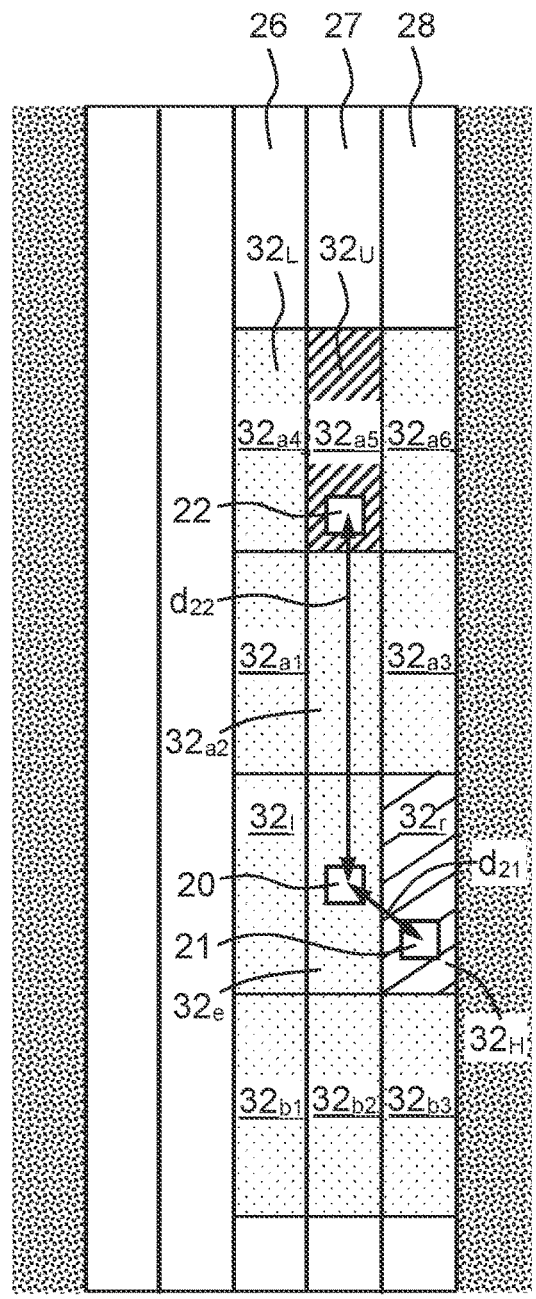
FIG. 2 is a schematic top view of the vehicles and highway of FIG. 1, showing selected attention zones.

FIG. 2 shows a schematic top view of the ego vehicle 20, the adjacent vehicle 21 and the leading vehicle 22 within selected attention zones 32. Vehicles/objects that are outside of the attention zones 32, such as vehicle 23 (in lane 26) and vehicles 24 and 25, are not shown or considered in this step. (Note that as used herein, "vehicle", "object" and "vehicle/object" may be used interchangeably. The plural forms of these terms may also be used interchangeably.) An attention zone 32, in the context of an ego vehicle 20 on a highway, is a section of road having a predetermined shape, size and location with respect to the ego vehicle 20. For example, as illustrated in FIG. 2, each attention zone 32 may be a generally rectangular space that is one lane wide and about three car lengths in length. The size and shape of attention zones 32 may be fixed, or the size and shape may vary depending on factors such as ego vehicle speed, type of road surface or terrain, weather conditions, curvature of the lanes, etc. Also note in FIG. 2 that only some portions of the highway have been represented as attention zones 32; specifically, there is one attention zone $32_e$ which the ego vehicle 20 is centered within, one attention zone $32_l$, $32_r$ on either side of the ego vehicle 20, one row of three attention zones $32_{b1}$, $32_{b2}$, $32_{b3}$ immediately behind the ego vehicle 20, and two rows of three attention zones $32_{a1}$, $32_{a2}$, $32_{a3}$, $32_{a4}$, $32_{a5}$, $32_{a6}$ immediately ahead of the ego vehicle 20. Note that any number and arrangement of attention zones 32 may be used. Also note that the arrangement of attention zones 32 about the ego vehicle 20 will dynamically move along with the ego vehicle 20, and the arrangement of attention zones 32 may optionally change as the ego vehicle 20 changes speed, changes heading, moves into other lanes, moves onto different road surfaces, moves into different road conditions, experiences a change in weather conditions, etc.

The attention zones 32 may optionally be divided into two or more types, such as Low Risk Zones $32_L$, High Risk Zones $32_H$ and Urgent Risk Zones $32_U$. For example, the attention zone 32, to the immediate right of the ego vehicle 20 is shown in widely-spaced cross-hatching, which identifies this attention zone $32_r$ as a High Risk Zone $32_H$ (due to the close proximity of the adjacent vehicle 22). The attention zone $32_{a5}$ directly ahead of the ego vehicle 20 is shown in closely-spaced cross-hatching, which identifies this attention zone $32_{a5}$ as an Urgent Risk Zone $32_U$ (due to the potential for the leading vehicle 22 to brake and thus interfere with the travel of the ego vehicle 20). The ego vehicle's attention zone $32_e$ and the other nine attention zones $32_1$, $32_{b1}$, $32_{b2}$, $32_{b3}$, $32_{a1}$, $32_{a2}$, $32_{a3}$, $32_{a4}$, $32_{a6}$ are shown in stippled shading, which identifies these as Low Risk Zones $32_L$.

An attention zone 32 may be characterized as being a Low Risk Zone $32_L$, a High Risk Zone $32_H$ or an Urgent Risk Zone $32_U$ based on various risk factors, such as the respective locations L, speeds S and headings H of the one or more vehicles/objects that are in the attention zone 32. These characteristics of location L, speed S and heading H may be viewed as affecting the proximity of each vehicle/object to the ego vehicle 20 and the potential for each vehicle/object to interfere with or adversely affect the forward travel of the ego vehicle 20. For example, the distance $d_{21}$ from the ego vehicle 20 to the adjacent vehicle 21 and the location of the adjacent vehicle 21 to the side and behind the ego vehicle 20 may cause the attention zone $32_{b3}$ to be characterized as a High Risk Zone $32_H$, while the distance $d_{22}$ from the ego vehicle 20 to the leading vehicle 22 and the location of leading vehicle 22 directly in front of the ego vehicle 20 may cause the attention zone $32_{a5}$ to be characterized as an Urgent Risk Zone $32_U$.

Once the attention zones 32 about the ego vehicle 20 have been identified, and each attention zone 32 has optionally been classified as being either a Low Risk Zone $32_L$, a High Risk Zone $32_H$ or an Urgent Risk Zone $32_U$, the respective locations L, speeds S and headings H of the vehicles/objects within each attention zone 32 may be determined relative to the location, speed and heading of the ego vehicle 20, and these relative locations L, relative speeds S and relative headings H may be stored in an event structure 39 as exemplified in FIG. 3. The event structure 39 may be a data structure, an ordered data set, a table, an organized grouping, a format, etc., in which the characteristics 49 of location L, speed S and heading H (and other optional data such as the distance d and individual risk IR) for each vehicle/object are stored.

Figure 8:
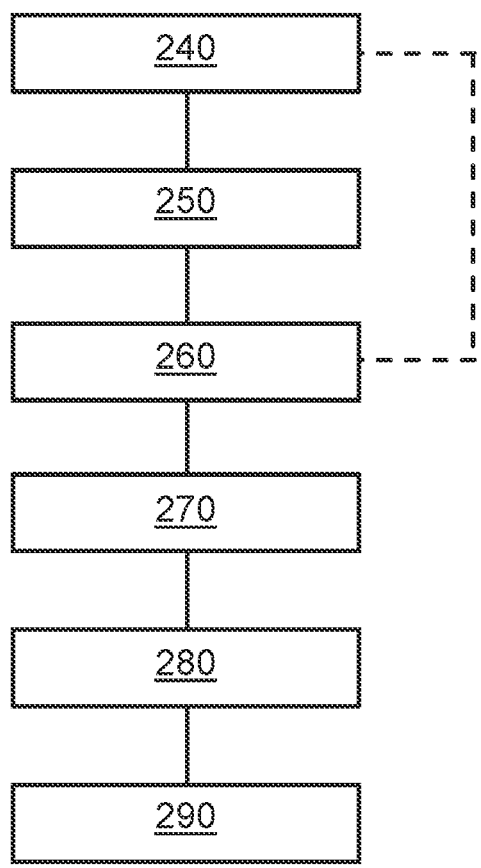
FIG. 8 is a block diagram of a system/controller for implementing the method of predictive navigation control.

As shown in FIG. 3, the event 30 (e.g. the traffic situation of FIGS. 1-2) is associated with three attention zones 32—one Low Risk Zone $32_L$, one High Risk Zone $32_H$ and one Urgent Risk Zone $32_U$. (Note that only one Low Risk Zone $32_L$ is shown in FIG. 8 for the sake of simplicity, but nine Low Risk Zones $32_L$ could be shown, as illustrated in FIG. 2.) The elements associated with the Low Risk Zone $32_L$ are drawn in dashed lines to indicate that no vehicles/objects are present in any of the Low Risk Zones $32_L$. The High Risk Zone $32_H$ is shown as having one vehicle 21, which has a location $L_{21}$, a speed $S_{21}$ and a heading $H_{21}$, and the Urgent Risk Zone $32_U$ is likewise shown as having one vehicle 22, which has a location $L_{22}$, a speed $S_{22}$ and a heading $H_{22}$. Note that while the adjacent vehicle 21 and leading vehicle 22 are shown in FIG. 3 (each represented as a hexagon), the event structure 39 may optionally exclude the identification of these individual vehicles 21, 22 and may instead include the respective locations $L_{21}$, $L_{22}$, speeds $S_{21}$, $S_{22}$ and headings $H_{21}$, $H_{22}$ of these vehicles 21, 22, as well as other related information such as their respective distances $d_{21}$, $d_{22}$ and individual risks $IR_{21}$, $IR_{22}$.

The event structure 39 may also include a distance d and an individual risk IR for each vehicle/object, where the distance d represents the distance between the vehicle/object and the ego vehicle 20, and the individual risk IR for each vehicle/object may be determined by a sigmoidal function applied to the distance d. (For example, as shown in FIG. 2, $d_{21}$ is the distance between the adjacent vehicle 21 and the ego vehicle 20, and $d_{22}$ is the distance between the leading vehicle 22 and the ego vehicle 20, and respective individual risks $IR_{21}$, $IR_{22}$ may be determined using these distances $d_{21}$, $d_{22}$ and a suitable sigmoidal equation, an example of which is provided below.)

As shown in FIG. 14, the characteristics 49 stored in the event structure 39 may also include additional information AI, such as: the number and type of attention zones 32 ($AI_{AZ}$) (e.g., a grid of twelve zones 42 situated as shown in FIGS. 2 and 5, and utilizing three types of zones 42 similar to the Low, High and Urgent Zones $32_L$, $42_L$, $32_H$, $42_H$, $32_U$, $42_U$ discussed above); the number of vehicles/objects in each attention zone 32 ($AI_{NO}$); the road surface type ($AI_{RS}$) (e.g., paved, gravel, dirt, etc.); the road structure type ($AI_{RT}$) (e.g., the number of lanes, the orientation of the lanes, etc.); the environment type ($AI_E$) (e.g., urban, residential, highway, parking lot, etc.); the weather/environmental conditions ($AI_{WC}$) (e.g., clear, light rain, heavy rain, snow, etc.); driving goal ($AI_{DG}$) (e.g., quickest path, leisure/scenic path, etc.); driving mode ($AI_M$) (e.g., cruising, sport, fuel-saving, etc.); vehicle type ($AI_{VT}$) (e.g., passenger vehicle, delivery vehicle, gross vehicle weight, horsepower, etc.); and powertrain type ($AI_{PT}$) (e.g., automatic, manual, electric, hybrid, number of gears, etc.). For example, as illustrated in FIG. 3, reference numeral $AI_{21}$ may represent one or more pieces of additional information AI relating to the adjacent vehicle 21, and $AI_{30}$ may represent one or more pieces of additional information AI relating to the event 30. This organized collection of information, stored in the format of the event structure 39, may serve as a numerical representation of the event 30, and may be represented as a cue node 34 as shown in FIG. 3. Note that FIG. 3 also shows the event structure 39 of the cue node 34 and its associated new event 30 also being applied to an EM node 36 and its associated previously existing event 40, and the additional information AI applying to both events 30, 40 as well (i.e., $AI_{30}$, $AI_{40}$).

A system or process which utilizes the approach described herein may begin by building an EM structure 38 from scratch, or by receiving or importing a previously created EM structure 38, which may have been created by another ego vehicle having similarities to the present ego vehicle 20 (i.e., similar vehicle type, similar powertrains, etc.). In either case, the system and approach may follow a process of sensing or receiving information about each new event 30 (FIG. 1), identifying an arrangement of attention zones 32 about the ego vehicle 20 with other neighboring vehicles/objects placed within those attention zones 32 (FIG. 2), organizing information about the attention zones 32 and the vehicles/objects therein in the format of an event structure 39 (FIG. 3), and transforming the organized information into a cue node 34 which may numerically represent the new event 30. The cue node 34 may then be compared with individual EM nodes 36 in the EM structure 38 (FIG. 4), where each EM node 36 represents a previously existing event 40. Whether the system and approach builds the EM structure 38 from scratch or starts with an imported EM structure 38, the system and approach may continue to expand the EM structure 38 over time as new events 30 are encountered, translated into cue nodes 36, and compared to the nodes 36 in the existing EM structure 38.

This comparison between the cue node 34 and each EM node 36 may be facilitated if each EM node 36 utilizes the same event structure 39 as the cue node 34, as illustrated in FIG. 3. Here, the exemplary EM node 36 represents a corresponding previously existing event 40 involving previously observed vehicles/objects, such as shown in FIG. 4. In FIG. 4, the ego vehicle 20 is traveling in the middle lane 47 of a three-lane highway. One adjacent vehicle 43 is beside the ego vehicle 20 in the right lane 48, and two leading vehicles 44, 45 are ahead of the ego vehicle 20 in the middle lane 47. No vehicles/objects are shown in the left lane 46. This traffic situation is similar to that of FIG. 1, in terms of the general locations of other neighboring vehicles/objects about the ego vehicle 20.

FIG. 5 shows a schematic diagram of the event 40 illustrated in FIG. 4, with attention zones 42 identified. Note that vehicle 45 is not included in FIG. 5, since it is not located in any of the defined attention zones 42. The attention zone 42 containing the adjacent vehicle 43 (i.e., attention zone $42_r$) is shown in widely-spaced cross-hatching to indicate it as a High Risk Zone $42_H$, and the attention zone 42 containing the leading vehicle 44 (i.e., attention zone $42_{a5}$) is shown in closely-spaced cross-hatching to indicate it as an Urgent Risk Zone $42_U$. Besides the attention zone 42 containing the ego vehicle 20 (i.e., attention zone $42_e$), the other nine attention zones 42 (i.e., $42_1$, $42_{b1}$, $42_{b2}$, $42_{b3}$, $42_{a1}$, $42_{a2}$, $42_{a3}$, $42_{a4}$ and $42_{a6}$) are shown in stippled shading to indicate them as Low Risk Zones $42_L$. Even though the distance $d_{44}$ from the ego vehicle 20 to the leading vehicle 44 (FIG. 5) is a little longer than the distance $d_{22}$ from the ego vehicle 20 to the leading vehicle 22 (FIG. 2), and the distance $d_{43}$ to the adjacent vehicle 43 is a little shorter than the distance $d_{21}$ to the adjacent vehicle 21, the attention zone diagrams of FIGS. 2 and 5 are nonetheless generally very similar to one another.

Each of the two previously observed vehicles 43, 44 within the attention zones 42 has a respective location $L_{43}$, $L_{44}$, speed $S_{43}$, $S_{44}$ and heading $H_{43}$, $H_{44}$ stored in the event structure 39, as well as each having a respective distance $d_{43}$, $d_{44}$ to the ego vehicle 20 and a respective object risk $OR_{43}$, $OR_{44}$ based on the respective distance $d_{43}$, $d_{44}$. The EM node 36 may also have a node risk NR and a likelihood LL associated therewith. The node risk NR represents the amount of risk the associated previously existing event 40 posed to the travel of the ego vehicle 20 (e.g., due to the neighboring vehicles' proximities, etc.), and the likelihood LL represents how likely it may be for the event 40 associated with the node 36 to occur (e.g., expressed as a decimal from 0.00 to 1.00 representing the likelihood LL as a percentage). Each EM node 36 may optionally also have a respective node reward NW, shown in dotted outline in FIG. 3. The node reward NW may be included as a numerical representation of one or more rewards or benefits that may be realized if the associated event 40 occurs.

Note that the exemplary EM node 36 of FIG. 3 has very similar contents to that of the cue node 34. That is, the event 30 represented by the cue node 34 has one vehicle 21 in one High Risk Zone $32_H$ and one vehicle 22 in one Urgent Risk Zone $32_U$, and likewise the event 40 represented by the exemplary EM node 36 has one vehicle 43 in one High Risk Zone $42_H$ and one vehicle 44 in one Urgent Risk Zone $42_U$. For the purpose of illustration, it may also be assumed that the location $L_{21}$, speed $S_{21}$ and heading $H_{21}$ of the adjacent vehicle 21 is very similar to the location $L_{43}$, speed $S_{43}$ and heading $H_{43}$ of vehicle 43 (thus making the distance $d_{21}$ and individual risk $IR_{21}$ very similar to the distance $d_{43}$ and object risk $OR_{43}$, respectively); and, that the location $L_{22}$, speed $S_{22}$ and heading $H_{22}$ of the leading vehicle 22 is very similar to the location $L_{44}$, speed $S_{44}$ and heading $H_{44}$ of vehicle 44 (thus making the distance $d_{22}$ and individual risk $IR_{22}$ very similar to the distance $d_{44}$ and object risk $OR_{44}$, respectively). Additionally, and as further described below, it may be assumed that the exemplary EM node 36 of FIG. 3 represents the EM node $36_1$ of FIG. 4, and that EM node $36_1$ is the best match with the cue node 34 among all the EM nodes 36 within the EM structure 38 of FIG. 4. However, it should be noted that while the contents and values of the exemplary node 36 of FIG. 3 (and EM node $36_1$ of FIG. 4) closely match the contents and values of the cue node 34, the contents and values of other EM nodes 36 may not match the cue node 34 so closely. For example, the EM nodes 36 in FIG. 4 other than node $36_1$ may each have a different number of vehicles/objects in their respective three attention/risk zones $42_L$, $42_H$, $42_U$, with different locations L, speeds S and headings H thereof (and thus different distances d and different object risks OR).

As illustrated in FIG. 6, the EM structure 38 is a selectively interconnected and directed network of EM nodes 36. (Here, each EM node 36 has been given a unique subscript from 0 to 22; i.e., $36_0$ to $36_{22}$.) Each EM node 36 represents a unique previously existing event 40, and the collection of EM nodes 36 represents an episode or situation which may involve various possible sequences of one or more of these events 40. The EM nodes 36 are selectively interconnected with each other in a directed manner, as indicated by the arrows in FIG. 4. The direction of an arrow between two EM nodes 36 indicates the possible temporal flow direction between those EM nodes 36. For example, each of the arrows pointing from EM node $36_1$ to EM nodes $36_0$, $36_2$, $36_7$, $36_{10}$ and $36_{11}$ indicates that once the event 40 represented by EM node $30_1$ has occurred, a possible next event 40 is represented by one of EM nodes $36_0$, $36_2$, $36_7$, $36_{10}$ and $36_{11}$. The direction of each arrow indicates a possible flow from an "upstream" EM node 36 to a "downstream" EM node 36, as well as from a "parent" EM node 36 to a "child" EM node 36. Thus, EM node $36_1$ is upstream from EM nodes $36_0$, $36_2$, $36_7$, $36_{10}$ and $36_{11}$, and each of EM nodes $36_0$, $36_2$, $36_7$, $36_{10}$ and $36_{11}$ is downstream from $36_1$; likewise, EM node $36_1$ would be a parent node to each of EM nodes $36_0$, $36_2$, $36_7$, $36_{10}$ and $36_{11}$, and EM nodes $36_0$, $36_2$, $36_7$, $36_{10}$ and $36_{11}$ would be child nodes to EM node $36_1$. Note that an upward-pointing arrow in the drawing may nonetheless indicate a downstream flow direction (such as the arrow pointing from EM node $36_{11}$ to EM node $36_0$); thus, the directions of the arrows—and not necessarily the location of EM nodes 36 on the page—is what determines the downstream/upstream direction of flow from node to node.

As noted above, an EM structure 38 represents a collection of possible sequences of events 40 for a given episode or situation. For example, in the context of automotive vehicles, each episode may be a particular driving situation, such as cruising, passing, turning off the highway at an exit, parking, backing up, etc. Each of these driving situations or episodes may have its own unique EM structure 38, with each EM structure 38 including a collection of possible sequences of events 40. Thus, a system or process utilizing the approach described herein may have access to multiple different stored EM structures 38 which can be selectively utilized and switched among in order to match the driving situation at hand.

The solid arrow of FIG. 3 illustrates the cue node 34 being compared with a single EM node 36, and the five solid arrows of FIG. 4 show the cue node 34 being compared with five particular EM nodes 36 in an EM structure 38. (Although only five comparisons are illustrated in FIG. 4, this is merely for the sake of simplicity, as in actual practice the cue node 34 would be compared with each and every one of the EM nodes 36.) Each of the EM nodes 36 may utilize the event structure 39 format to represent its respective attention zones 42 and various event-related information, which may facilitate the comparison of the cue node 34 with each EM node 36.

As mentioned above, if the cue node 34 sufficiently matches one or more of the EM nodes 36, the cue node 34 may be merged or consolidated into the best matching EM node $36_1$; but, if the cue node 34 does not sufficiently match any of the EM nodes 36, the cue node 34 may be added to the EM structure 38 as a new EM node $36_{22}$. (Note that while reference numerals $36_1$ and $36_{22}$ are used in FIG. 4 to represent two particular EM nodes 36, these reference numerals are also used herein to generally represent a best matching node $36_1$ and a new node $36_{22}$, respectively.) For example, as noted earlier, if it is determined that the contents and values of EM node $36_1$ has the best match with the contents and values of the cue node 34, and if this match is close enough (e.g., smaller than some predetermined amount or threshold), then the cue node 34 may be merged into EM node $36_1$; but, if the match between node $36_1$ and the cue node 34 is not close enough, then the cue node 34 may be added to the EM structure 38 as a new node, such as node $36_{22}$ which has been appended to EM node $36_{20}$ and is shown in dotted outline. Once the cue node 34 has been consolidated into a best matching node $36_1$ or added as a new node $36_{22}$, it is assumed that the best matching or new node $36_1$, $36_{22}$ (as the case may be) is the node from which the likeliest and/or riskiest nodes $36_2$, $36_{10}$ may be determined.

A respective difference metric may be determined for each EM node 36, based on a respective aggregate difference between one or more characteristics 49 of the EM node 36 and the same one or more characteristics 49 of the cue node 34. Once the difference metrics are determined for all the EM nodes 36, the EM node 36 having the smallest difference metric may be identified as the best matching EM node $36_1$. Next, if the difference metric of the best matching EM node $36_1$ is less than a predetermined match tolerance, then the cue node 34 is consolidated into the best matching node $36_1$; otherwise, the cue node 34 is added to the EM structure 38 as a new node $36_{22}$.

When the cue node 34 is merged or consolidated into a best matching EM node $36_1$, the merger or consolidation may optionally have an effect on the best matching EM node 36i. For example, the consolidation may cause the likelihood LL of the best matching EM node $36_1$ to be incremented or increased. On the other hand, when the cue node 34 is added as a new EM node $36_{22}$, it may be added as a child node to the EM node 36 which has the closest match therewith, which is assumed to be EM node $36_{20}$ in FIG. 4. (That is, the new EM node $36_{22}$ may be added as a child node to one or more parent nodes, wherein each parent node is a previously existing EM node 36.) Note that while the new node $36_{22}$ is shown here as having no child node, in some cases a new node $36_{22}$ may be inserted between (and connected with) two or more EM nodes 36, in which case the new node $36_{22}$ would have one or more child nodes.

Figure 7:
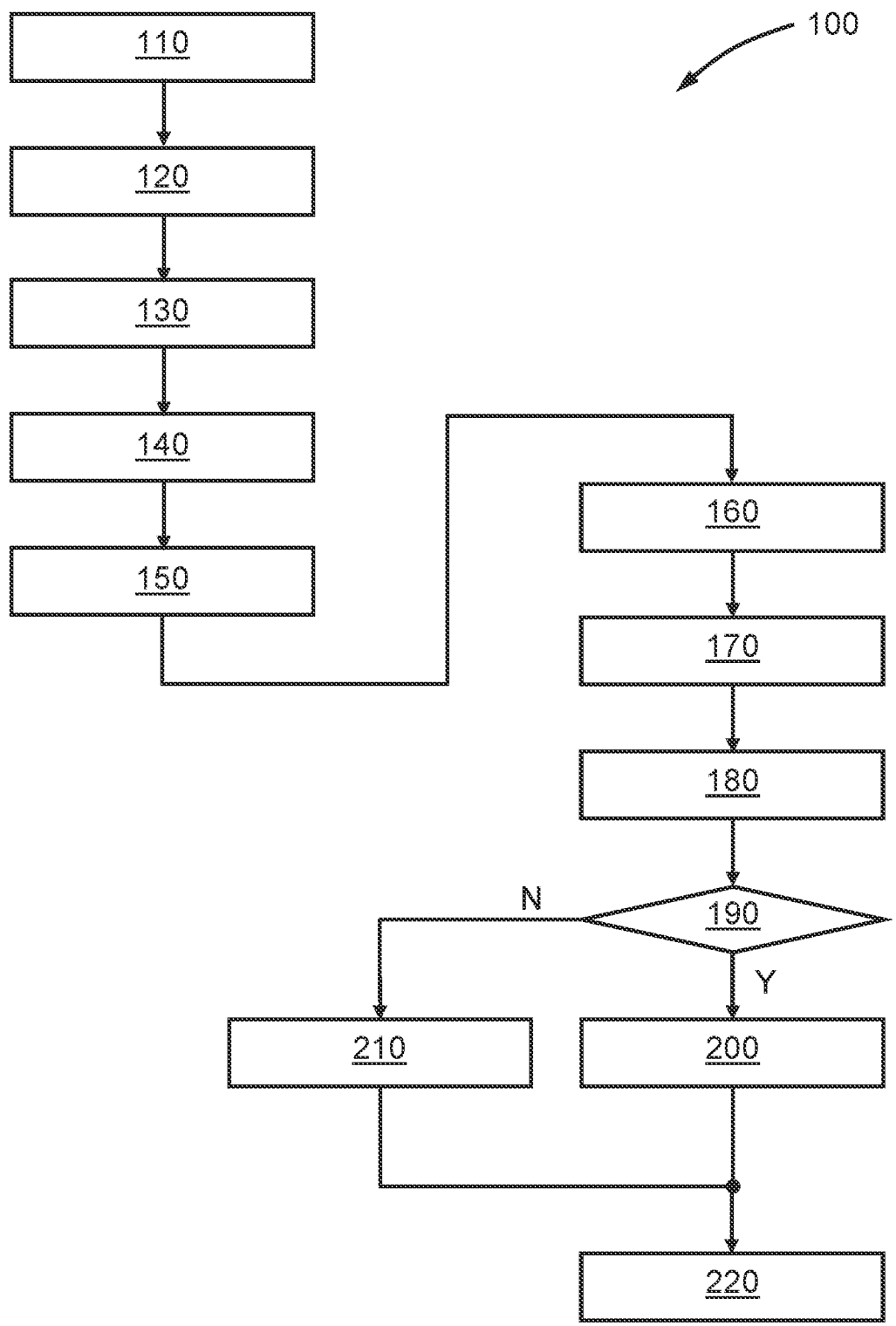
FIG. 7 is a flowchart for a method of predictive navigation control.

Proceeding now to describe the foregoing approach in further detail, according to one embodiment (and as illustrated by the flowchart in FIG. 7), a method 100 of predictive navigation control for an ego vehicle 20 includes a comparing step (block 160), a determining step (block 170), a consolidating step (block 200) and an identifying step (block 220). At block 160, the comparing step includes comparing a cue node 34 to each of a plurality of EM nodes 36 in an EM structure 38, wherein the cue node 34 represents a new event 30. The new event 30 is associated with a set of respective locations L, speeds S and headings H, which in turn are associated with one or more newly observed objects 21. (Note that while reference numeral 21 is used in FIGS. 1-2 to represent the adjacent vehicle 21, this reference numeral is also used herein to represent one or more newly observed objects 21.) Each newly observed object 21 is located within a respective one of a plurality of newly defined attention zones 32 about the ego vehicle 20. The EM structure 38 includes a selectively interconnected and directed network of EM nodes 36, wherein each EM node 36 represents a respective previously existing event 40. Each previously existing event 40 is associated with a respective set of locations L, speeds S and headings H, which are associated with one or more previously observed objects 43. (Note that while reference numeral 43 is used in FIGS. 4-5 to represent a particular vehicle/object 43, this reference numeral is also used herein to represent one or more previously observed objects 43.) Each previously observed object 43 is located within one of a plurality of previously defined attention zones 42 about the ego vehicle 20. Additionally, each EM node 36 has a respective node risk NR and a respective likelihood LL (and optionally a respective node reward NW) associated therewith.

At block 170, the determining step includes determining which one of the plurality of EM nodes 36 has a smallest respective difference metric, thus defining a best matching EM node $36_1$. Each respective difference metric is determined based on a respective aggregate difference between one or more respective characteristics 49 of the respective EM node 36 and the cue node 34. As illustrated in FIG. 14, these characteristics 49 may include one or more of the number and type of attention zones 32, 42 ($AI_{AZ}$), the number of objects in each attention zone 32, 42 ($AI_{NO}$), road surface type ($AI_{RS}$), road structure type ($AI_{RT}$), environment type ($AI_E$), weather/environmental conditions ($AI_{WC}$), driving goal ($AI_{DG}$), driving mode ($AI_{DM}$), vehicle type ($AI_{VT}$), powertrain type ($AI_{PT}$) and the respective locations L, speeds S, headings H, distances d from the ego vehicle 20 and individual/object risks IR, OR associated with the one or more previously observed and/or newly observed objects 43, 21.

Each of the respective locations L, speeds S and headings H of the one or more newly observed objects 21 and the one or more previously observed objects 43 may be defined with respect to the ego vehicle 20. (That is, the ego vehicle 20 may serve as the origin of a referential coordinate axis against which the locations L, speeds S and headings H may be measured.) The aggregate difference may be a sum, average or maximum of the differences between or among these characteristics 49. For example, using the event 30 illustrated in FIGS. 1-2 and the event structure of FIG. 3, the aggregate difference may be a sum of the differences between the corresponding locations L of the vehicles/objects; that is, $(L_{44}-L_{22})+(L_{43}-L_{21})$, where each of the locations L is broken into its x- and y-components, based on a coordinate system having its origin at the ego vehicle 20. Additionally, each respective aggregate difference may be a respective total of one or more weighted penalties assigned against each of one or more differences between the respective characteristics 49 of the respective EM node 36 and the cue node 34.

At block 190, a check is made as to whether the smallest respective difference metric (between the cue node 34 and the best matching node $36_1$) is less than a predetermined match tolerance. If so, then at block 200 the consolidating step is executed in which the cue node 34 is consolidated with the best matching EM node $36_1$; but if not (i.e., the smallest respective difference metric is greater than or equal to the predetermined match tolerance), then at block 210 a new EM node $36_{22}$ corresponding to the cue node 34 is added to the EM structure 38. The new EM node $36_{22}$ may be assigned an initial likelihood value (i.e., an initial value of the new node's likelihood LL); optionally, the new node $36_{22}$ may also be assigned an initial node risk NR and an initial node reward NW as well.

At block 220, the identifying step includes identifying the likeliest next node $36_2$ and/or the riskiest next node $36_{10}$. (Note that while reference numerals $36_2$ and $36_{10}$ are used in FIG. 3 to represent two specific EM nodes 36, these reference numerals are also used herein to generally represent the likeliest and riskiest next EM nodes $36_{22}$, $36_{10}$, respectively.) If the cue node 34 was consolidated into the best matching node $36_1$, then the likeliest next node $36_2$ will be the node 36 having the highest likelihood LL among the nodes 36 immediately downstream of the best matching node $36_1$, and the riskiest next node $36_{10}$ will be the node 36 having the highest node risk NR among the nodes 36 immediately downstream of the best matching node $36_1$. On the other hand, if the cue node 34 was added as a new node $36_{22}$, and if there are one or more nodes 36 immediately downstream of the new node $36_{22}$, then the likeliest next node $36_2$ will be the node 36 having the highest likelihood LL among the nodes 36 immediately downstream of the new node $36_{22}$, and the riskiest next node $36_{10}$ will be the node 36 having the highest node risk NR among the nodes 36 immediately downstream of the new node $36_{22}$. If there are no nodes 36 immediately downstream of the new node $36_{22}$, such as the case shown in FIG. 4, then no likeliest or riskiest next nodes $36_2$, $36_{10}$ will be identified. However, in such a case, it is likely that the ego vehicle 20 is experiencing new events 30 that are significantly different from its previously experienced previously existing events 40, and the ego vehicle 20 will continue to add new nodes $36_{22}$ to the EM structure 38 as the ego vehicle 20 progresses onward. In this way, the EM structure 38 may be expanded to incorporate all new events 30 experienced by the ego vehicle 20. An EM structure 38 may continue to grow over time and may become quite complex, such that in some cases the likeliest next node $36_2$ and the riskiest next node $36_{22}$ may be the same node 36.

The respective node risk NR of each EM node 36 may be a respective maximum, average or aggregate of respective object risks OR for the one or more previously observed objects 43 in the associated previously existing event 40. The respective object risk OR for each previously observed object 43 may be determined by a sigmoidal function applied to a respective distance $d_{43}$ between the previously observed object 43 and the ego vehicle 20. (Note that while reference numeral $d_{43}$ is used in FIG. 5 to represent a particular distance $d_{43}$, this reference numeral is also used herein to generally represent the distance $d_{43}$ between a previously observed object 43 and the ego vehicle 20.) For example, FIGS. 3 and 5 show two previously observed objects 43, 44 having respective distances $d_{43}$, $d_{44}$ to the ego vehicle 20. Since sigmoidal functions return a value between 0 and 1, where 0 may signify little or no proximity risk and 1 may signify high risk, let it be assumed for the sake of illustration that the object risk $OR_{43}$ for the closer adjacent vehicle/object 43 is 0.7 and the object risk $OR_{44}$ for the leading vehicle/object 44 is 0.3. In this case, the node risk NR for the EM node 36 associated with the event 40 may be a maximum (0.7), average (0.5) or aggregate of these two object risks $OR_{43}$, $OR_{44}$. The aggregate may be a sum of these object risks $OR_{43}$, $OR_{44}$ (1.0), a sum of the maximum and average (1.2), a midpoint between the maximum and average (0.6), or any other suitable combination.

The method 100 may further include, at block 130, the steps of: (i) calculating a respective individual risk IR for each of the one or more newly observed objects 21 using a sigmoidal function applied to a respective distance d between each respective newly observed object 21 and the ego vehicle 20; (ii) at block 140, establishing a respective overall or total risk TR for each of the plurality of newly defined attention zones 32, based on the respective individual risks IR of the one or more newly observed objects 21 located within each respective newly defined attention zone 32; and (iii), at block 150, defining the cue node 34 as a grouping of the plurality of newly defined attention zones 32 organized according to their respective overall risks TR. (For example, the grouping of attention zones 32 may be ordered according to one of: Low/High/Urgent Risk Zones $32_L$, $32_H$, $32_U$; Urgent/High/Low Risk Zones $32_U$, $32_H$, $32_L$; and ascending or descending order of overall/total risk TR.)

The overall/total risk TR for each newly defined attention zone 32 may be determined from the individual risks IR of the newly observed object(s) 21 in that attention zone 32. For example, using the new event 30 illustrated in FIGS. 1-2, the overall/total risk TR for the Urgent Risk Zone $32_U$, $32_{a5}$ may be the same as the individual risk IR of the leading vehicle 22 which is in that zone $32_U$, $32_{a5}$. If two additional vehicles/objects were in that zone $32_U$, $32_{a5}$, then the overall/total risk TR for that Urgent Risk Zone $32_U$, $32_{a5}$ would be determined from the individual risks IR of all three of the vehicles/objects in that attention zone $32_U$, $32_{a5}$. The overall/total risk TR for a newly defined attention zone 32 may be a maximum, average, sum or aggregate of the individual risks IR of the vehicles/objects in that zone 32.

The object risk OR for each previously observed object 43, and/or the individual risk IR for each newly observed object 21, may be determined by the sigmoidal equation $R=2 \cdot (\{1-1/(1+e^{[(mindist-SAFEDIST)/(SAFEDIST/2)]}\} - 0.5)+0.5$, where R is the respective object risk OR or individual risk IR, mindist is the distance $d_{43}$, $d_{21}$ to the previously observed or newly observed object 43, 21 from the ego vehicle 20, and where SAFEDIST is a distance which depends on one or more of a road surface type, road structure type, weather/environmental conditions, and a relative lane position, closing velocity or closing acceleration between the previously observed or newly observed object 43, 21 and the ego vehicle 20.

The method 100 may further include, at block 180, the step of back-propagating a respective node risk NR associated with a high-risk EM node 36 to one or more EM nodes 36 upstream of the high-risk EM node 36, wherein the node risk NR associated with the high-risk EM node 36 is greater than a predetermined risk threshold. This back-propagation of the associated node risk NR may utilize a linear function or a logistic function. For example, if a given EM node 36 has a node risk NR that is above the predetermined risk threshold, then that node may be regarded as a high-risk node 36, and the node risk NR for that high-risk node 36 may be back-propagated to one or more other nodes 36 that are immediately upstream of the high-risk node 36.

The method 100 may further include, at block 110, the step of detecting, as perceived data, the set of respective locations L, speeds S and headings H associated with the one or more newly observed objects 21; and, at block 120, the step of converting the perceived data into inputs, signals or data relating to the cue node 34, such as for reception by a data ingest module 260 (described in further detail below).

FIG. 8 shows a block diagram of a system/controller 230 for predictive navigation control for an ego vehicle 20, which is configured to execute some or all of the steps of the aforementioned method 100. The system/controller 230 may include all of the blocks or modules shown in FIG. 8, or it may include a subset of these blocks or modules. Each of these blocks or modules may be implemented in hardware, software and/or firmware form, with two or more of the blocks or modules being integrated together (e.g., as part of a single hardware unit) and one or more other blocks or modules being implemented separately.

The system/controller 230 includes a data ingest module 260, an EM module 270 and a prediction module 280. The data ingest module 260 is configured to receive inputs relating to a cue node 34, wherein the cue node 34 represents a new event 30 associated with a set of respective locations L, speeds S and headings H, which are associated with one or more newly observed objects 21, with each newly observed object 21 located within a respective one of a plurality of newly defined attention zones 32 about the ego vehicle 20. The data ingest module 260 is further configured to: (i) calculate a respective individual risk IR for each of the one or more newly observed objects 21 using a sigmoidal function applied to a respective distance d between each respective newly observed object 21 and the ego vehicle 20; (ii) establish a respective overall risk TR for each of the plurality of newly defined attention zones 32, based on the respective individual risks IR of the one or more newly observed objects 21 located within each respective newly defined attention zone 32; and (iii) define the cue node 34 as a grouping of the plurality of newly defined attention zones 32 organized according to their respective overall risks TR.

The EM module 270 is operatively connected with the data ingest module 260 and contains an EM structure 38 including a selectively interconnected and directed network of EM nodes 36, wherein each EM node 36 represents a respective previously existing event 40, with each previously existing event 40 being associated with a respective set of locations L, speeds S and headings H associated with one or more previously observed objects 43 each located within one of a plurality of previously defined attention zones 42 about the ego vehicle 20, and wherein each EM node 36 has a respective node risk NR and a respective likelihood LL associated therewith. The EM module 270 is configured to: (x) compare the cue node 34 to each of the EM nodes 36; (y) determine which of the EM nodes 36 has a smallest respective difference metric, thus defining a best matching EM node $36_1$, wherein each respective difference metric is determined based on a respective aggregate difference between one or more respective characteristics 49 of the respective EM node 36 and the cue node 34; and (z) consolidate the cue node 34 with the best matching EM node $36_1$ if the smallest respective difference metric is less than a predetermined match tolerance, otherwise add a new EM node $36_{22}$ corresponding to the cue node 34 to the EM structure 38 if the smallest respective difference metric is greater than or equal to the predetermined match tolerance.

The prediction module 280 is operatively connected with the EM module 270 and is configured to identify one or both of: a likeliest next node $36_2$ among one or more EM nodes 36 immediately downstream from the best matching or new EM node $36_1$, $36_{22}$, wherein the likeliest next node $36_2$ has a highest likelihood LL among the immediately downstream EM nodes 36; and a riskiest next node $36_{10}$ among the one or more EM nodes 36 immediately downstream from the best matching or new EM node $36_1$, $36_{22}$, wherein the riskiest next node $36_{10}$ has a highest node risk NR among the immediately downstream EM nodes 36.

The system/controller 230 may further include a perception module 250 operatively connected with the data ingest module 260 and configured to: detect, as perceived data, the set of respective locations L, speeds S and headings H associated with the one or more newly observed objects 21; and convert the perceived data into the inputs relating to the cue node 34 for reception by the data ingest module 260. The system/controller 230 may additionally include one or more sensors 240 (e.g., RADAR, LIDAR, ultrasonic, infrared, temperature, etc.) operatively connected with and providing input signals to the perception module 250. Furthermore, the prediction module 280 may be operatively connected with other modules/devices 290 that are external to the system/controller 230.

The respective node risk NR of each EM node 36 may be a respective maximum, average or aggregate of respective object risks OR for the one or more previously observed objects 43 in the associated previously existing event 40, and the respective object risk OR for each previously observed object 43 may be determined by a sigmoidal function applied to a respective distance $d_{43}$ between the previously observed object 43 and the ego vehicle 20. The EM module 270 may be further configured to back-propagate a respective node risk NR associated with a high-risk EM node 36 to one or more EM nodes 36 upstream of the high-risk EM node 36, where the associated node risk NR is greater than a predetermined risk threshold.

Figure 10:
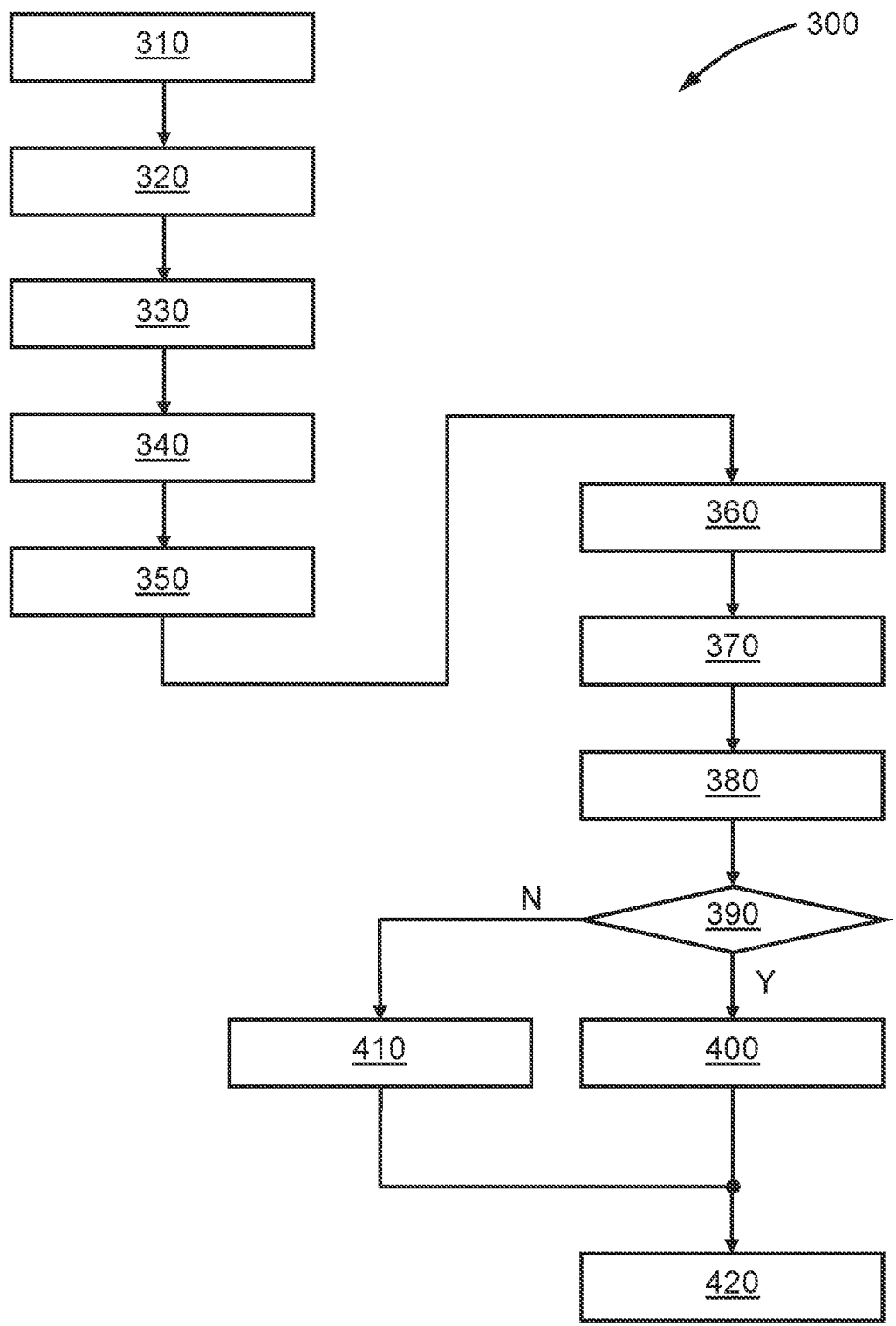
FIG. 10 is a flowchart for the method of optimizing a decision for a decider.
Figure 11:
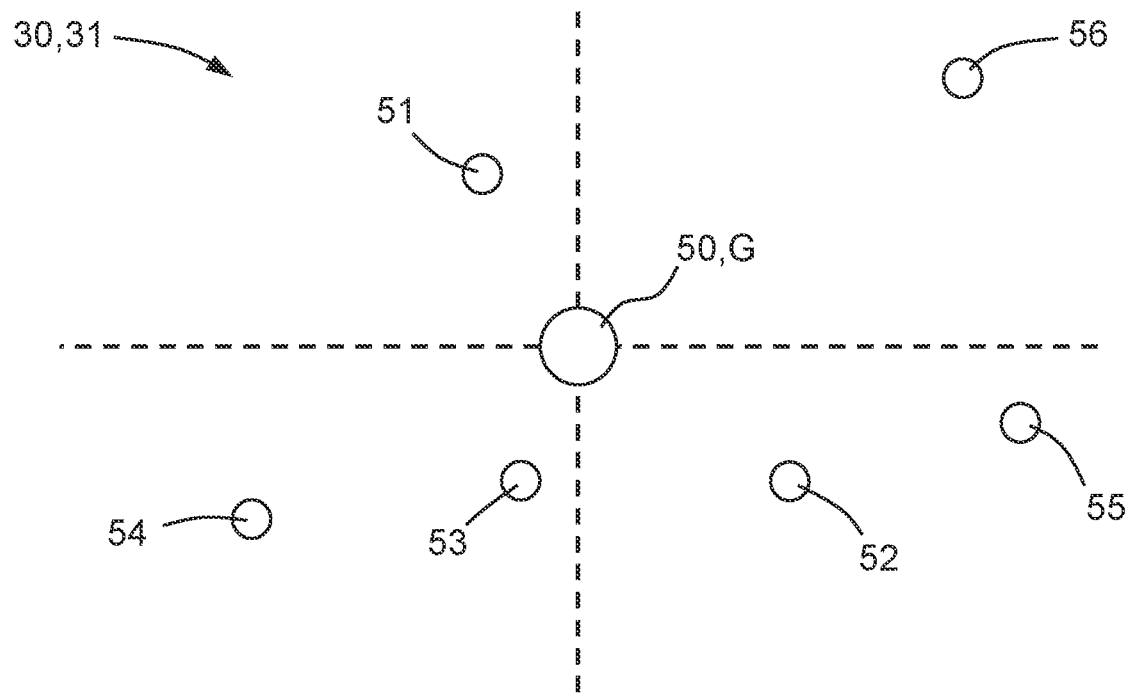
FIG. 11 is a diagram of a decider and various stimuli.
Figure 12:
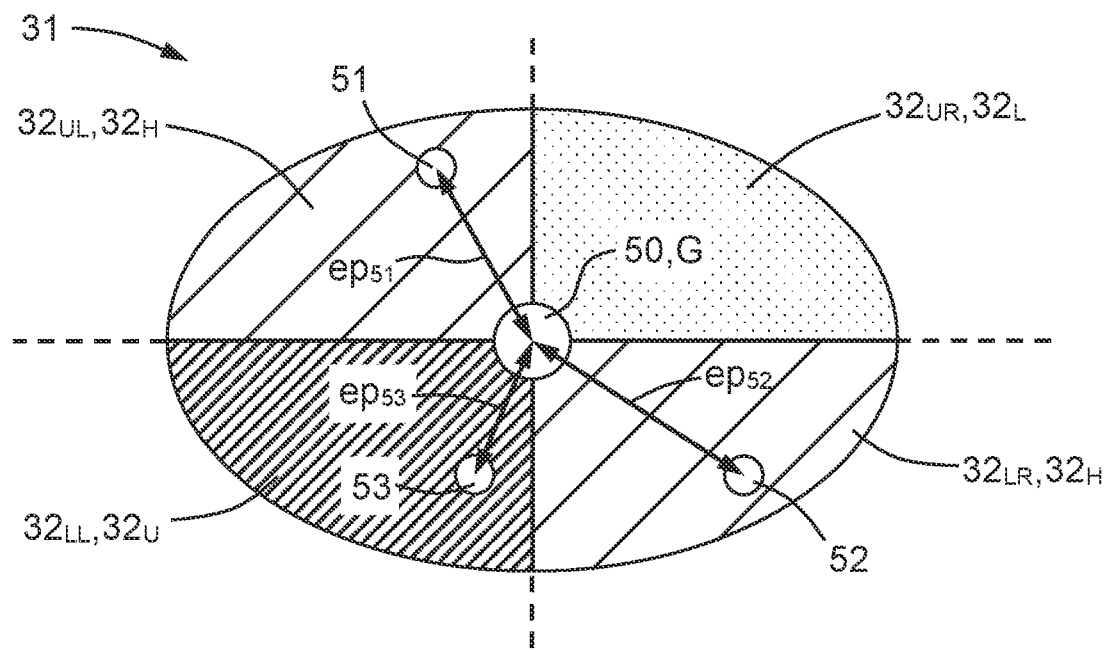
FIG. 12 is a diagram of the decider and stimuli of FIG. 11, showing selected attention zones.
Figure 13:
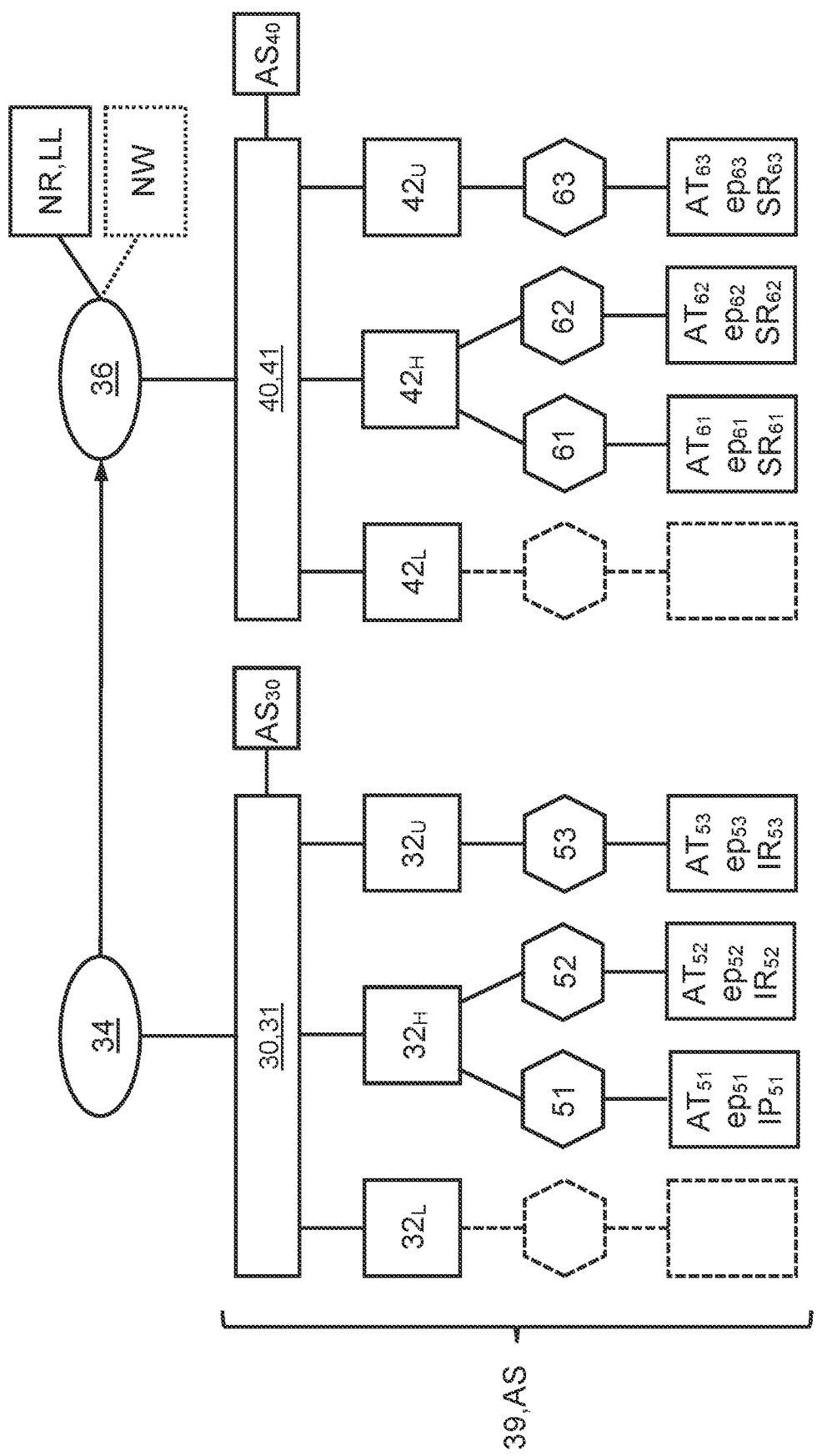
FIG. 13 is a diagram showing a cue node being compared with an episodic memory node utilizing a common event structure, for a method of optimizing a decision for a decider.

While the approach of the present disclosure as shown in FIGS. 1-8 has been described in terms of predictive navigation control for an ego vehicle 20, the approach may also extend to optimizing a decision for a decider 50. For example, FIG. 10 shows a flowchart for a method 300 of optimizing a decision for a decider 50, in which the method 300 includes a comparing step (block 360), a determining step (block 370), a consolidating step (block 400) and an identifying step (block 420). The method 300 may also be described with reference to FIGS. 11-13, where FIG. 11 shows a decider 50 and various stimuli 51, 52, 53, 54, 55, 56 associated with a new event 30, FIG. 12 shows the decider 50 and selected stimuli 51, 52, 53 along with selected attention zones $32_{UL}$, $32_{UR}$, $32_{LL}$, $32_{LR}$, and FIG. 13 shows a cue node 34 being compared with an EM node 36 utilizing a common event structure 39. (Note that FIG. 4, showing a cue node 34 being compared with the EM nodes 36 in an EM structure 38, also applies to the method 300.)

The decider 50 may be a system or device which is configured to make decisions, such as a process controller, a control module or the like. The decider 50 may use the method 300 to guide, assist with or optimize the decider's decision-making process. The stimuli 51-56 may be information pertaining to the new event 30, and the stimuli 51-56 may be visualized or represented as individual points or bits of information in an information space. The information space may be a two-dimensional, three-dimensional or higher-dimensional construct having multiple axes or dimensions. For example, as shown in FIGS. 11-12, the information space may be visualized or represented as a two-dimensional area having two orthogonal axes crossing at an origin where the decider 50 may be visualized or represented. Each of these axes may be used to measure a particular characteristic, quality or feature. For example, the vertical axis may measure difficulty level and the horizontal axis may measure cost, with the origin being situated at a nominal or predetermined combination of difficulty level and cost. The collection of stimuli 51-56 represent various bits of information about the event 30 as observed at a current state 31, and the event 30 may be any situation involving or requiring an action or a decision. The current state 31 may be a current moment in time, and may include the state of one or more features of the decider 50 at the current moment in time. For example, the features of the decider 50 may include the contents of memories, registers and buffers associated with the decider 50, the current command set and goals 50 that the decider 50 is operating under, etc.

Each stimulus 51 may have one or more attributes or qualities AT associated therewith. (Note that while reference numeral 51 is used in FIGS. 11-13 to represent a particular newly observed stimulus 51, this reference numeral is also used herein to generally represent one or more newly observed stimulus/stimuli 51.) These attributes or qualities AT, as shown in FIG. 15, may include one or more of importance $AT_I$, urgency $AT_U$, risk $AT_R$, reward $AT_W$, cost $AT_C$, duration $AT_D$ and difficulty $AT_X$. The attributes or qualities AT may relate to the characteristics, qualities or features that are measured or indicated by the axes in the information space, or they may differ therefrom.

The method 300 involves taking a given event 30 involving one or more stimuli 51-56 (FIG. 11), identifying an arrangement of attention zones 32 defined with respect to the current state 31 of the decider 50 with the associated stimuli 51-53 located within and/or assigned to their respective attention zones 32 (FIG. 12), organizing the collection of attention zones 32 and other data according to an event structure 39 (FIG. 13), and representing this collection of information as a cue node 34 which can be compared with individual episodic memory nodes 36 in an episodic memory structure 38 (FIG. 4). If the cue node 34 sufficiently matches one of the EM nodes 36 in the EM structure 38, the cue node 34 may be merged or consolidated into the matching EM node $36_1$; but, if the cue node 34 does not sufficiently match any of the EM nodes 36, the cue node 34 may be added to the EM structure 38 as a new EM node $36_{22}$.

Turning again to FIGS. 10-13, at block 360 the comparing step includes comparing a cue node 34 to each of a plurality of EM nodes 36 in an EM structure 38. The cue node 34 represents a new event 30 associated with a set of respective attributes $AT_{51}$, $AT_{52}$, $AT_{53}$ which are associated with one or more newly observed stimuli 51, 52, 53, wherein each stimulus 51 is assigned to a respective one of a plurality of newly defined attention zones $32_L$, $32_H$, $32_U$ defined with respect to a current state 31 of the decider 50. The EM structure 38 includes a selectively interconnected and directed network of the EM nodes 36, wherein each EM node 36 represents a respective previously existing event 40. Each previously existing event 40 is associated with a respective set of attributes $AT_{61}$, $AT_{62}$, $AT_{63}$ which are associated with one or more previously observed stimuli 61, 62, 63, each assigned to a respective one of a plurality of previously defined attention zones $42_L$, $42_H$, $42_U$ defined with respect to a respective previous state 41 of the decider 50. (The previous state 41 may be a previous moment in time, and may include the state of one or more features of the decider 50 at the previous moment in time.) Each EM node 36 has a respective node risk NR and a respective likelihood LL associated therewith, and optionally may have a respective node reward NW associated therewith. (Note that while reference numeral 61 is used in FIGS. 11-13 to represent a particular previously observed stimulus 61, this reference numeral is also used herein to generally represent one or more previously observed stimulus/stimuli 61.)

The goals G of the decider 50 may include one or more of minimizing risk $G_{MR}$, optimizing utility $G_{OU}$, optimizing risk versus reward $G_{RR}$, learning to anticipate a user's needs $G_{AN}$, finding the most helpful information $G_{FI}$, and learning how to recognize when to offer help to a user $G_{OH}$. These goals G may be useful when the decider 50 is utilized in process controllers, logic/control modules, personal data assistants, virtual assistants, expert systems and the like. Each of the respective attributes AT of the one or more newly observed stimuli 51 and the one or more previously observed stimuli 61 may be defined with respect to one or more goals G of the decider 50. For example, the goals G may determine the axes used in the information space, and the stimuli 51, 61 may be placed, visualized and/or represented with respect to these axes in the information space.

The attention zones 32 are represented in FIG. 12 as quadrants of an elliptical subset of the information space. Note that other possible shapes and sizes of the subset of information space may also be used. Stimulus 51 is shown in the lower-left quadrant or attention zone $32_{LL}$, which is shown as an Urgent Risk Zone $32_U$ (due to the proximity of the stimulus 51 to the origin). Stimulus 52 is shown in the upper-left quadrant or attention zone $32_{UL}$, which is shown as a High Risk Zone $32_H$, and stimulus 53 is shown in the lower-right quadrant or attention zone $32_{LR}$, which is also shown as a High Risk Zone $32_H$. The upper-right quadrant or attention zone $32_{UR}$ has no stimuli therein, and is shown in stippled shading as a Low Risk Zone $32_L$. Note that stimuli 54, 55 and 56 are not shown, as they do not fall within any of the attention zones 32. Stimuli 51, 52 and 53 have respective effect potentials $ep_{51}$, $ep_{52}$ and $ep_{53}$, which represents the effect each stimulus 51, 52, 53 may have upon one or more goals G of the decider 50, as further described below. The distance between the origin and a given stimulus 51 represents the magnitude of the stimulus' effect on the accomplishment of the one or more goals G. For example, since stimulus 51 is closer to the origin than is stimulus 53, stimulus 51 may be viewed as having a greater effect on the accomplishment (or not) of the goals G than would stimulus 53.

At block 370, the determining step includes determining which of the plurality of EM nodes 36 has a smallest respective difference metric, thus defining a best matching EM node $36_1$. Each respective difference metric is determined based on a respective aggregate difference between one or more respective aspects AS of the respective EM node 36 and the cue node 34. These aspects AS are analogous to the characteristics 50 of method 100, and, as illustrated in FIG. 15, may include one or more of user temperament $AS_T$ (e.g., mood, energy level, alertness level, etc.), user skill level $AS_U$ (e.g., based on previous decisions and outcomes versus goals G), environmental factors $AS_E$ (e.g., time of day or night, level of distractions in the surrounding environment, etc.), and prior user tendencies and habits $AS_H$ (based on previous performance), as well as the respective importance $AS_I$, urgency $AS_U$, risk $AS_R$, reward $AS_W$, cost $AS_C$, duration $AS_D$ and difficulty $AS_X$ associated with the one or more newly observed or previously observed stimuli 51, 61. Note that certain aspects AS may also be attributes AT, and vice versa, as indicated by the dashed lines in FIG. 15; for example, importance may be expressed as an aspect $AS_I$ and/or as an attribute $AT_I$. The same holds true for urgency $AS_U$, $AT_U$, risk $AS_R$, $AT_R$, reward $AS_W$, $AT_W$, cost $AS_C$, $AT_C$, duration $AS_D$, $AT_D$ and difficulty $AS_X$, $AT_X$. In some instances, these respective aspects AS and attributes AT may be used interchangeably. Note that while FIG. 13 shows only one attribute AT for each newly observed stimulus 51, 52, 53 (i.e., $AT_{51}$, $AT_{52}$, $AT_{53}$) and for each previously observed stimulus 61, 62, 63 (i.e., $AT_{61}$, $AT_{62}$, $AT_{63}$), and only one aspect AS for the new event 30 (i.e., $AS_{30}$) and for the previously existing event 40 (i.e., $AS_{40}$), there may be more than one attribute AT or aspect AS associated with each of these.

The aggregate difference may be a sum, average or maximum of the differences between or among the respective aspects AS of the cue node 34 and each EM node 36. Additionally, each respective aggregate difference may be a respective total of one or more weighted penalties assigned against each of one or more differences between the respective aspects AS of the respective EM node 36 and the cue node 34.

At block 390, a check is made as to whether the smallest respective difference metric (between the cue node 34 and the best matching node $36_1$) is less than a predetermined match tolerance. If so, then at block 400 the consolidating step is executed in which the cue node 34 is consolidated with the best matching EM node $36_1$; but if not (i.e., the smallest respective difference metric is greater than or equal to the predetermined match tolerance), then at block 410 a new EM node $36_{22}$ corresponding to the cue node 34 is added to the EM structure 38. The new EM node $36_{22}$ may be assigned an initial likelihood value (i.e., an initial value of the new node's likelihood LL); optionally, the new node $36_{22}$ may also be assigned an initial node risk NR and an initial node reward NW as well.

At block 420, the identifying step includes identifying the likeliest next node $36_2$ and/or the riskiest next node $36_{10}$. If the cue node 34 was consolidated into the best matching node $36_1$, then the likeliest next node $36_2$ will be the node 36 having the highest likelihood LL among the nodes 36 immediately downstream of the best matching node $36_1$, and the riskiest next node $36_{10}$ will be the node 36 having the highest node risk NR among the nodes 36 immediately downstream of the best matching node $36_1$. On the other hand, if the cue node 34 was added as a new node $36_{22}$, and if there are one or more nodes 36 immediately downstream of the new node $36_{22}$, then the likeliest next node $36_2$ will be the node 36 having the highest likelihood LL among the nodes 36 immediately downstream of the new node $36_{22}$, and the riskiest next node $36_{10}$ will be the node 36 having the highest node risk NR among the nodes 36 immediately downstream of the new node $36_{22}$. If there are no nodes 36 immediately downstream of the new node $36_{22}$, such as the case shown in FIG. 4, then no likeliest or riskiest next nodes $36_2$, $36_{10}$ will be identified. However, in such a case, it is likely that the decider 50 is experiencing new events 30 that are significantly different from its previously experienced previously existing events 40, and the decider 50 will continue to add new nodes $36_{22}$ to the EM structure 38 as the decider 50 progresses onward. In this way, the EM structure 38 may be expanded to incorporate all new events 30 experienced by the decider 50. An EM structure 38 may continue to grow over time and may become quite complex, such that in some cases the likeliest next node $36_2$ and the riskiest next node $36_{22}$ may be the same node 36.

The respective node risk NR of each EM node 36 may be a respective maximum, average or aggregate of respective stimulus risks $SR_{61}$, $SR_{62}$, $SR_{63}$ for the one or more previously observed stimuli 61, 62, 63 in the associated previously existing event 40. The respective stimulus risk SR for each previously observed stimulus 61, 62, 63 may be determined by a sigmoidal function applied to a respective effect potential $ep_{61}$, $ep_{62}$, $ep_{63}$ between the previously observed stimulus 61, 62, 63 and the one or more goals G of the decider 50. (Note that while reference numeral $ep_{61}$ is used in FIG. 12 to represent a particular effect potential $ep_{61}$, this reference numeral is also used herein to generally represent the effect potential $ep_{61}$ between a previously observed stimulus 61 and the one or more goals G of the decider 50.)

The method 300 may further include, at block 330, the steps of: (i) calculating a respective individual risk $IR_{51}$, $IR_{52}$, $IR_{53}$ for each of the one or more newly observed stimuli 51, 52, 53 using a sigmoidal function applied to a respective effect potential $ep_{51}$, $ep_{52}$, $ep_{53}$ between each respective newly observed stimulus 51, 52, 53 and the one or more goals G of the decider 50; (ii) at block 340, establishing a respective overall risk TR for each of the plurality of newly defined attention zones 32, based on the respective individual risks IR of the one or more newly observed stimuli 51 assigned to each respective newly defined attention zone 32; and (iii), at block 350, defining the cue node 34 as a grouping of the plurality of newly defined attention zones 32 organized according to their respective overall risks TR.

The method 300 may further include, at block 380, the step of back-propagating a respective node risk NR associated with a high-risk EM node 36 to one or more EM nodes 36 upstream of the high-risk EM node 36, wherein the node risk NR associated with the high-risk EM node 36 is greater than a predetermined risk threshold. This back-propagation of the associated node risk NR may utilize a linear function or a logistic function. For example, if a given EM node 36 has a node risk NR that is above the predetermined risk threshold, then that node may be regarded as a high-risk node 36, and the node risk NR for that high-risk node 36 may be back-propagated to one or more other nodes 36 that are immediately upstream of the high-risk node 36.

The method 300 may further include, at block 310, the step of detecting, as perceived data, the set of respective attributes AT associated with the one or more newly observed stimuli 51; and, at block 320, the step of converting the perceived data into inputs, signals or data relating to the cue node 34, such as for reception by a data ingest module 460 (described in further detail below).

Figure 9:
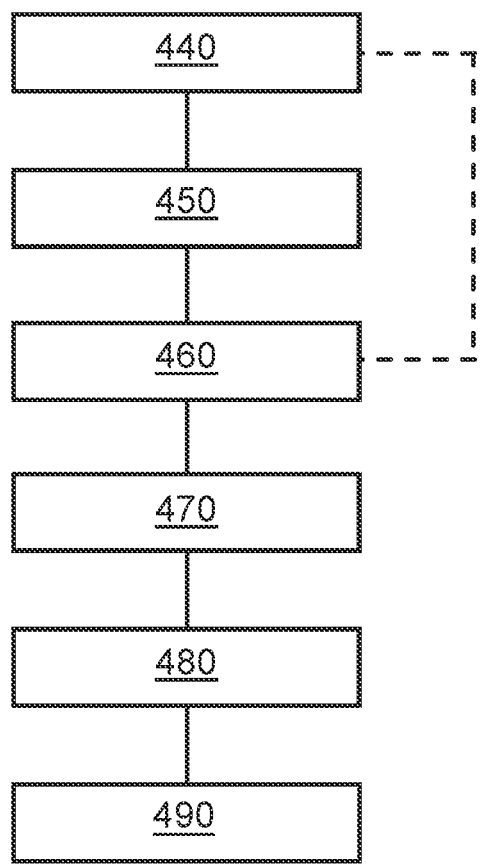
FIG. 9 is a block diagram of a system/controller for implementing a method of optimizing a decision for a decider.

FIG. 9 shows a block diagram of a system/controller 430 for optimizing a decision for a decider 50, which is configured to execute some or all of the steps of the aforementioned method 300. The system/controller 430 may include all of the blocks or modules shown in FIG. 9, or it may include a subset of these blocks or modules. Each of these blocks or modules may be implemented in hardware, software and/or firmware form, with two or more of the blocks or modules being integrated together (e.g., as part of a single hardware unit) and one or more other blocks or modules being implemented separately.

The system/controller 430 includes a data ingest module 460, an EM module 470 and a prediction module 480. The data ingest module 460 is configured to receive inputs relating to a cue node 34, wherein the cue node 34 represents a new event 30 associated with a set of respective attributes AT associated with one or more newly observed stimuli 51, with each newly observed stimulus 51 located within and/or assigned to a respective one of a plurality of newly defined attention zones 32 defined with respect to a current state 31 of the decider 50. The data ingest module 460 is further configured to: (i) calculate a respective individual risk IR for each of the one or more newly observed stimuli 51 using a sigmoidal function applied to a respective effect potential ep between each respective newly observed stimulus 51 and the one or more goals G of the decider 50; (ii) establish a respective overall risk TR for each of the plurality of newly defined attention zones 32, based on the respective individual risks IR of the one or more newly observed stimuli 51 located within and/or assigned to each respective newly defined attention zone 32; and (iii) define the cue node 34 as a grouping of the plurality of newly defined attention zones 32 organized according to their respective overall risks TR.

The EM module 470 is operatively connected with the data ingest module 460 and contains an EM structure 38 including a selectively interconnected and directed network of EM nodes 36, wherein each EM node 36 represents a respective previously existing event 40, with each previously existing event 40 being associated with a respective set of attributes AT associated with one or more previously observed stimuli 61 each located within and/or assigned to a respective one of a plurality of previously defined attention zones 42 defined with respect to a respective previous state 41 of the decider 50, and wherein each EM node 36 has a respective node risk NR and a respective likelihood LL associated therewith. The EM module 470 is configured to: (x) compare the cue node 34 to each of the EM nodes 36; (y) determine which of the EM nodes 36 has a smallest respective difference metric, thus defining a best matching EM node $36_1$, wherein each respective difference metric is determined based on a respective aggregate difference between one or more respective aspects AS of the respective EM node 36 and the cue node 34; and (z) consolidate the cue node 34 with the best matching EM node $36_1$ if the smallest respective difference metric is less than a predetermined match tolerance, otherwise add a new EM node $36_{22}$ corresponding to the cue node 34 to the EM structure 38 if the smallest respective difference metric is greater than or equal to the predetermined match tolerance.

The prediction module 480 is operatively connected with the EM module 470 and is configured to identify one or both of: a likeliest next node $36_2$ among one or more EM nodes 36 immediately downstream from the best matching or new EM node $36_1$, $36_{22}$, wherein the likeliest next node $36_2$ has a highest likelihood LL among the immediately downstream EM nodes 36; and a riskiest next node $36_{10}$ among the one or more EM nodes 36 immediately downstream from the best matching or new EM node $36_1$, $36_{22}$, wherein the riskiest next node $36_{10}$ has a highest node risk NR among the immediately downstream EM nodes 36. Furthermore, the prediction module 480 may be operatively connected with other modules/devices 490 that are external to the system/controller 430.

The system/controller 430 may further include a perception module 450 operatively connected with the data ingest module 460 and configured to: detect, as perceived data, the set of respective attributes AT associated with the one or more newly observed stimuli 51; and convert the perceived data into the inputs relating to the cue node 34 for reception by the data ingest module 460. The system/controller 430 may additionally include one or more sensors 440 (e.g., RADAR, LIDAR, ultrasonic, infrared, temperature, etc.) operatively connected with and providing input signals to the perception module 450.

The respective node risk NR of each EM node 36 may be a respective maximum, average or aggregate of respective object risks OR for the one or more previously observed stimuli 61 in the associated previously existing event 40, and the respective object risk OR for each previously observed stimulus 61 may be determined by a sigmoidal function applied to a respective effect potential ep between the previously observed object 43 and the one or more goals G of the decider 50. The EM module 470 may be further configured to back-propagate a respective node risk NR associated with a high-risk EM node 36 to one or more EM nodes 36 upstream of the high-risk EM node 36, where the associated node risk NR is greater than a predetermined risk threshold.

Being able to predict the riskiest and likeliest next EM nodes $36_{10}$, $36_2$ may assist the ego vehicle 20 to make its next move or decision (thus providing a form of predictive navigation), and likewise may assist the decider 50 to optimize its next move or decision.

The above description is intended to be illustrative, and not restrictive. While the dimensions and types of materials described herein are intended to be illustrative, they are by no means limiting and are exemplary embodiments. In the following claims, use of the terms "first", "second", "top", "bottom", etc. are used merely as labels, and are not intended to impose numerical or positional requirements on their objects. As used herein, an element or step recited in the singular and preceded by the word "a" or "an" should be understood as not excluding plural of such elements or steps, unless such exclusion is explicitly stated. Additionally, the phrase "at least one of A and B" and the phrase "A and/or B" should each be understood to mean "only A, only B, or both A and B". Moreover, unless explicitly stated to the contrary, embodiments "comprising" or "having" an element or a plurality of elements having a particular property may include additional such elements not having that property. And when broadly descriptive adverbs such as "substantially" and "generally" are used herein to modify an adjective, these adverbs mean "for the most part", "to a significant extent" and/or "to a large degree", and do not necessarily mean "perfectly", "completely", "strictly" or "entirely".

The flowcharts and block diagrams in the drawings illustrate the architecture, functionality and/or operation of possible implementations of systems, methods and computer program products according to various embodiments of the present disclosure. In this regard, each block in the flowchart or block diagrams may represent a module, segment or portion of code, which includes one or more executable instructions for implementing the specified logical function(s). It will also be noted that each block of the block diagrams and/or flowchart illustrations, and combinations of blocks in the block diagrams and/or flowchart illustrations, may be implemented by hardware-based systems that perform the specified functions or acts, or combinations of hardware and computer instructions. These computer program instructions may also be stored in a computer-readable medium that can direct a controller or other programmable data processing apparatus to function in a particular manner, such that the instructions stored in the computer-readable medium produce an article of manufacture including instructions to implement the functions and/or actions specified in the flowcharts and block diagrams.

This written description uses examples, including the best mode, to enable those skilled in the art to make and use devices, systems and compositions of matter, and to perform methods, according to this disclosure. It is the following claims, including equivalents, which define the scope of the present disclosure.

What is claimed is:

1. A method of predictive navigation control for an ego vehicle, comprising:
    comparing a cue node to each of a plurality of episodic memory nodes in an episodic memory structure, wherein the cue node represents a new event associated with a set of respective locations, speeds and headings associated with one or more newly observed objects each located within a respective one of a plurality of newly defined attention zones about the ego vehicle, and wherein the episodic memory structure comprises a selectively interconnected and directed network of the episodic memory nodes, wherein each episodic memory node represents a respective previously existing event, with each previously existing event being associated with a respective set of locations, speeds and headings associated with one or more previously observed objects each located within a respective one of a plurality of previously defined attention zones about the ego vehicle, and wherein each episodic memory node has a respective node risk and a respective likelihood associated therewith;
    determining which of the plurality of episodic memory nodes has a smallest respective difference metric, thus defining a best matching episodic memory node, wherein each respective difference metric is determined based on a respective aggregate difference between one or more respective characteristics of the respective episodic memory node and the cue node;
    consolidating the cue node with the best matching episodic memory node if the smallest respective difference metric is less than a predetermined match tolerance, or adding a new episodic memory node corresponding to the cue node to the episodic memory structure if the smallest respective difference metric is greater than or equal to the predetermined match tolerance; and
    identifying one or both of (i) a likeliest next episodic memory node among one or more episodic memory nodes immediately downstream from the best matching or new episodic memory node, wherein the likeliest next episodic memory node has a highest likelihood among the immediately downstream episodic memory nodes, and (ii) a riskiest next episodic memory node among the one or more episodic memory nodes immediately downstream from the best matching or new episodic memory node, wherein the riskiest next episodic memory node has a highest node risk among the immediately downstream episodic memory nodes.

2. The method according to claim 1, wherein the respective node risk of each episodic memory node is a respective maximum, average or aggregate of respective object risks for the one or more previously observed objects in the associated previously existing event, and wherein the respective object risk for each previously observed object is determined by a sigmoidal function applied to a respective distance between the previously observed object and the ego vehicle.

3. The method according to claim 2, further comprising:
    calculating a respective individual risk for each of the one or more newly observed objects using the sigmoidal function applied to a respective distance between each respective newly observed object and the ego vehicle;
    establishing a respective overall risk for each of the plurality of newly defined attention zones, based on the respective individual risks of the one or more newly observed objects located within each respective newly defined attention zone; and
    defining the cue node as a grouping of the plurality of newly defined attention zones organized according to their respective overall risks.

4. The method according to claim 3, wherein the respective object risk or individual risk for each previously observed or newly observed object, respectively, is determined by $R=2 \cdot (\{1-1/(1+e^{[(\text{mindist}-\text{SAFEDIST})/(\text{SAFEDIST}/2)]}\}-0.5)+0.5$, where R is the respective object risk or individual risk, mindist is a distance to the previously observed or newly observed object from the ego vehicle, and where SAFEDIST is a distance which depends on one or more of a road surface type, road structure type, weather/environmental conditions, and a relative lane position, closing velocity or closing acceleration between the previously observed or newly observed object and the ego vehicle.

5. The method according to claim 1, wherein each of the respective locations, speeds and headings of the one or more newly observed objects and the one or more previously observed objects is defined with respect to the ego vehicle.

6. The method according to claim 1, wherein each respective aggregate difference is a respective total of one or more weighted penalties assigned against each of one or more differences between the respective characteristics of the respective episodic memory node and the cue node, and wherein the characteristics include one or more of number and type of attention zones, number of objects in each attention zone, road surface type, road structure type, environment type, weather/environmental conditions, driving goal, driving mode, vehicle type, powertrain type and respective locations, speeds, headings, distances from the ego vehicle and object risks associated with the one or more previously observed and/or newly observed objects.

7. The method according to claim 1, further comprising:
back-propagating a respective node risk associated with a high-risk episodic memory node to one or more episodic memory nodes upstream of the high-risk episodic memory node, wherein the associated node risk is greater than a predetermined risk threshold.

8. The method according to claim 7, wherein the back-propagation of the associated node risk utilizes a linear function or a logistic function.

9. The method according to claim 1, wherein when a new episodic memory node is added to the episodic memory structure, the new episodic memory node is added as a child node to one or more parent nodes, wherein each parent node is a previously existing episodic memory node, and wherein the new episodic memory node is assigned an initial likelihood value.

10. The method according to claim 1, wherein each episodic memory node also has a respective node reward.

11. A method of optimizing a decision for a decider, comprising:
comparing a cue node to each of a plurality of episodic memory nodes in an episodic memory structure, wherein the cue node represents a new event associated with a set of respective attributes associated with one or more newly observed stimuli each assigned to a respective one of a plurality of newly defined attention zones defined with respect to a current state of the decider, and wherein the episodic memory structure comprises a selectively interconnected and directed network of the episodic memory nodes, wherein each episodic memory node represents a respective previously existing event, with each previously existing event being associated with a respective set of attributes associated with one or more previously observed stimuli each assigned to a respective one of a plurality of previously defined attention zones defined with respect to a respective previous state of the decider, and wherein each episodic memory node has a respective node risk and a respective likelihood associated therewith;
determining which of the plurality of episodic memory nodes has a smallest respective difference metric, thus defining a best matching episodic memory node, wherein each respective difference metric is determined based on a respective aggregate difference between one or more respective aspects of the respective episodic memory node and the cue node;
consolidating the cue node with the best matching episodic memory node if the smallest respective difference metric is less than a predetermined match tolerance, or adding a new episodic memory node corresponding to the cue node to the episodic memory structure if the smallest respective difference metric is greater than or equal to the predetermined match tolerance; and
identifying one or both of (i) a likeliest next episodic memory node among one or more episodic memory nodes immediately downstream from the best matching or new episodic memory node, wherein the likeliest next episodic memory node has a highest likelihood among the immediately downstream episodic memory nodes, and (ii) a riskiest next episodic memory node among the one or more episodic memory nodes immediately downstream from the best matching or new episodic memory node, wherein the riskiest next episodic memory node has a highest node risk among the immediately downstream episodic memory nodes.

12. The method according to claim 11, wherein each of the respective attributes of the one or more newly observed stimuli and the one or more previously observed stimuli is defined with respect to one or more goals of the decider.

13. The method according to claim 12, wherein the respective node risk of each episodic memory node is a respective maximum, average or aggregate of respective stimulus risks for the one or more previously observed stimuli in the associated previously existing event, and wherein the respective stimulus risk for each previously observed stimulus is determined by a sigmoidal function applied to a respective effect potential between the previously observed stimulus and the one or more goals of the decider.

14. The method according to claim 13, further comprising:
calculating a respective individual risk for each of the one or more newly observed stimuli using the sigmoidal function applied to a respective effect potential between each respective newly observed stimulus and the one or more goals of the decider;
establishing a respective overall risk for each of the plurality of newly defined attention zones, based on the respective individual risks of the one or more newly observed stimuli assigned to each respective newly defined attention zone; and
defining the cue node as a grouping of the plurality of newly defined attention zones organized according to their respective overall risks.

15. The method according to claim 11, wherein each respective aggregate difference is a respective total of one or more weighted penalties assigned against each of one or more differences between the respective aspects of the respective episodic memory node and the cue node.

16. The method according to claim 12, wherein: (i) the attributes include one or more of importance, urgency, risk, reward, cost, duration and difficulty; (ii) the aspects include one or more of user temperament, user skill level, environmental factors, prior user habits and the respective importance, urgency, risk, reward, cost, duration and difficulty associated with the one or more previously observed or newly observed stimuli; and (iii) the goals of the decider include one or more of minimizing risk, optimizing utility, optimizing risk versus reward, learning to anticipate a user's needs, finding the most helpful information, and learning how to recognize when to offer help to a user.

17. A controller for predictive navigation control for an ego vehicle, comprising:
(a) a data ingest module configured to receive inputs relating to a cue node, wherein the cue node represents a new event associated with a set of respective locations, speeds and headings associated with one or more newly observed objects each located within a respective one of a plurality of newly defined attention zones about the ego vehicle, the data ingest module being further configured to:

calculate a respective individual risk for each of the one or more newly observed objects using a sigmoidal function applied to a respective distance between each respective newly observed object and the ego vehicle;

establish a respective overall risk for each of the plurality of newly defined attention zones, based on the respective individual risks of the one or more newly observed objects located within each respective newly defined attention zone; and define the cue node as a grouping of the plurality of newly defined attention zones organized according to their respective overall risks;

(b) an episodic memory module operatively connected with the data ingest module and containing an episodic memory structure comprising a selectively interconnected and directed network of episodic memory nodes, wherein each episodic memory node represents a respective previously existing event, with each previously existing event being associated with a respective set of locations, speeds and headings associated with one or more previously observed objects each located within a respective one of a plurality of previously defined attention zones about the ego vehicle, and wherein each episodic memory node has a respective node risk and a respective likelihood associated therewith, the episodic memory module being configured to:

compare the cue node to each of the episodic memory nodes;

determine which of the episodic memory nodes has a smallest respective difference metric, thus defining a best matching episodic memory node, wherein each respective difference metric is determined based on a respective aggregate difference between one or more respective characteristics of the respective episodic memory node and the cue node; and consolidate the cue node with the best matching episodic memory node if the smallest respective difference metric is less than a predetermined match tolerance, or add a new episodic memory node corresponding to the cue node to the episodic memory structure if the smallest respective difference metric is greater than or equal to the predetermined match tolerance; and (c) a prediction module operatively connected with the episodic memory module and configured to identify one or both of (i) a likeliest next episodic memory node among one or more episodic memory nodes immediately downstream from the best matching or new episodic memory node, wherein the likeliest next episodic memory node has a highest likelihood among the immediately downstream episodic memory nodes, and (ii) a riskiest next episodic memory node among the one or more episodic memory nodes immediately downstream from the best matching or new episodic memory node, wherein the riskiest next episodic memory node has a highest node risk among the immediately downstream episodic memory nodes.

18. The controller according to claim 17, further comprising:

(d) a perception module operatively connected with the data ingest module and configured to:

detect, as perceived data, the set of respective locations, speeds and headings associated with the one or more newly observed objects; and convert the perceived data into the inputs relating to the cue node for reception by the data ingest module.

19. The controller according to claim 17, wherein the respective node risk of each episodic memory node is a respective maximum, average or aggregate of respective object risks for the one or more previously observed objects in the associated previously existing event, and wherein the respective object risk for each previously observed object is determined by the sigmoidal function applied to a respective distance between the previously observed object and the ego vehicle.

20. The controller according to claim 17, wherein the episodic memory module is further configured to:

back-propagate a respective node risk associated with a high-risk episodic memory node to one or more episodic memory nodes upstream of the high-risk episodic memory node, where the associated node risk is greater than a predetermined risk threshold.

* * * * *